United States Patent
Kadam et al.

(10) Patent No.: US 11,301,365 B1
(45) Date of Patent: Apr. 12, 2022

(54) SOFTWARE TEST COVERAGE THROUGH REAL-TIME TRACING OF USER ACTIVITY

(71) Applicant: ServiceNow, Inc., Santa Clara, CA (US)

(72) Inventors: Vaibhav Kadam, Hyderabad (IN); Ankush Agrawal, Hyderabad (IN); Ragunath Sigicherla, Hyderabad (IN); Amit Jain, Hyderabad (IN)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 17/148,003

(22) Filed: Jan. 13, 2021

(51) Int. Cl.
*G06F 11/36* (2006.01)
*G06F 8/70* (2018.01)
*G06F 11/34* (2006.01)

(52) U.S. Cl.
CPC ............ *G06F 11/3676* (2013.01); *G06F 8/70* (2013.01); *G06F 11/3495* (2013.01)

(58) Field of Classification Search
CPC ..... G06F 8/70; G06F 11/3495; G06F 11/3676
See application file for complete search history.

(56) References Cited

U.S. PATENT DOCUMENTS

| | | |
|---|---|---|
| 4,941,084 A | 7/1990 | Terada et al. |
| 5,185,860 A | 2/1993 | Wu |
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |

(Continued)

FOREIGN PATENT DOCUMENTS

| | | |
|---|---|---|
| EP | 0433979 | 6/1991 |
| EP | 1607824 | 12/2005 |

(Continued)

OTHER PUBLICATIONS

U.S. Appl. No. 15/981,544, filed May 16, 2018.
U.S. Appl. No. 16/163,142, filed Oct. 17, 2018.

*Primary Examiner* — S. Sough
*Assistant Examiner* — Stephen D Berman
(74) *Attorney, Agent, or Firm* — McDonnell Boehnen Hulbert & Berghoff LLP

(57) ABSTRACT

A computing system includes persistent storage containing a plurality of groups of software instructions, wherein each respective group is linked with at least one other group. The computing system also includes a software application configured to perform operations, including determining an expected execution map representing expected paths that are expected to be followed between linked groups of software instructions. The operations also include monitoring interactions of a user with the plurality of groups, and based on the monitoring, determining an observed execution map representing observed paths that the user has followed between the linked groups of software instructions. The operations further include determining a disparity map representing a disparity between the expected paths and the observed paths by comparing the expected execution map to the observed execution map, and displaying the expected execution map, the observed execution map, and/or the disparity map.

20 Claims, 16 Drawing Sheets

(56) References Cited

U.S. PATENT DOCUMENTS

| | | |
|---|---|---|
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 9,098,555 B2 | 8/2015 | Bjork et al. |
| 9,559,928 B1* | 1/2017 | Porter ................ H04L 41/5058 |
| 9,727,448 B1* | 8/2017 | Seibert, Jr. ............ G06F 11/368 |
| 9,990,272 B2* | 6/2018 | Cooper .............. G06F 11/3684 |
| 10,079,730 B2 | 9/2018 | Subramanian et al. |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2004/0093538 A1* | 5/2004 | Hester ................ G06F 11/3636 714/45 |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2012/0016706 A1 | 1/2012 | Pargaonkar et al. |
| 2015/0169158 A1* | 6/2015 | Kyte .................... G06F 11/366 715/806 |
| 2015/0347278 A1* | 12/2015 | Sinha .................. G06F 11/3664 714/38.1 |
| 2019/0317885 A1* | 10/2019 | Heinecke ............ G06F 11/3409 |
| 2021/0081308 A1* | 3/2021 | Golubev ............. G06F 11/3438 |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

\* cited by examiner

SOFTWARE TEST COVERAGE THROUGH REAL-TIME TRACING OF USER ACTIVITY

BACKGROUND

Computer software products are typically tested before being released. A software product may be tested by providing one or more inputs to the software product and observing how the software product behaves. For instance, software tests may check that, for each input, the software product produces a desired or expected output. Software testing may involve unit testing (e.g., testing of an individual software unit), integration testing (e.g., testing of a group of software units operating together), functional testing (i.e., testing to determine whether specified functionality desired in a system works properly), system testing (e.g., testing the software product in different hardware or operating system environments), stress testing (i.e., testing to determine how the software product behaves under unfavorable conditions), performance testing (e.g., testing to determine how long the software product takes to perform a given operation), and/or regression testing (i.e., testing to determine whether a modification to one software unit causes other software units to work incorrectly), among other possibilities. Although software testing may evaluate various aspects of a software product, some users may use the software product in ways that might not have been anticipated, and thus might not have been tested.

SUMMARY

A software product may include and/or be defined by a plurality of groups of software instructions. More particularly, a software application may include and/or be defined by a plurality of software functions, each of which is defined by a corresponding group of software instructions. For example, a web portal may include and/or be defined by a plurality of web pages and/or user interface (UI) components, each of which is defined by a corresponding group of software instructions. The groups of software instructions may be linked together in that, for example, interaction with a particular group of software instructions may hyperlink to, cause execution of, and/or trigger a modification of at least one other group of software instructions. The links between groups of software instructions may allow these groups of software instructions, and thus the software product, to be traversed in various ways. For example, the links may allow a user to move through different web pages of a web portal in a plurality of different orders. Two or more linked groups of software instructions may define a path through at least part of the software product.

In order to validate and/or improve operations of the software product, the software product may be designed and/or tested to provide expected paths that are expected to be followed between linked groups of software instructions. For example, a user may be expected to follow a sequence of web pages by clicking on hyperlinked content in a given web page to get to a subsequent web page of the sequence. In some cases, however, the user may also be able to traverse the software product in ways that might not have been explicitly planned and/or tested, but that may nevertheless be provided as part of the software product. That is, the user may interact with the software products in ways that might not have been intended and/or contemplated during programming and/or testing, but that are nevertheless made possible by the links between groups of software instructions. In such cases, the user may sometimes experience degraded performance, since the software product might not be explicitly configured to handle the user's unexpected behavior.

Thus, in order to reduce the gap between expected usage of the software product and actual usage of the software product, the expected usage and the observed usage may each be determined, quantified, mapped, compared, and/or used as a basis for adjusting one or more aspects of the software product in order to, for example, more closely match the user's actual usage and/or eliminate unintended paths through the software product. Specifically, a software application may be configured to determine an expected execution map that represents the expected paths that are expected to be followed between linked groups of software instructions. For example, the expected execution map may be manually defined as part of programming and/or design of the software product. Thus, the expected execution map may represent paths that a programmer and/or designer expects and/or intends to be traversed by users. In another example, the expected execution map may be determined by monitoring interactions of manual and/or automated software tests with the plurality of groups of software instructions. Thus, the expected execution map may represent paths that have been tested in preparation for expected traversal by users.

The software application may also be configured to determine an observed execution map that represents observed paths that the user has followed between the linked groups of software instructions. To this end, the software application may be configured to monitor interactions of the user with the plurality of groups of software instructions. For example, the software application may determine a sequence in which the user visits a plurality of web pages, a sequence in which the user interacts with a plurality of UI components, and/or a sequence with which the user's interactions trigger execution of a plurality of software functions, among other possibilities. Thus, the observed execution map may reflect users' actual, rather than expected, usage of the software product.

The software application may also be configured to compare the expected execution map to the observed execution map in order to determine a disparity map. The disparity map may reflect the disparity (e.g., difference or quotient) between users' actual usage and the expected usage of the software product.

The expected execution map and the observed execution map may each include one or more respective values indicative of respective frequencies with which the various paths represented by these maps are followed. Thus, a comparison between a particular path as represented by the expected execution map and the particular path as represented by the observed execution map may include comparing a respective expected value (as represented by the expected execution map) associated with the particular path to a respective observed value (as represented by the observed execution map) associated with the particular path to determine a disparity therebetween. The disparity may be, for example, a difference or a quotient based on the respective observed value and the respective observed value. Thus, the disparity may indicate, for example, that the particular path is traversed more frequently than expected, less frequently than expected, and/or within a threshold extent of the expectation.

The expected execution map, the observed execution map, and/or the disparity map may be displayed to allow for visual representation of the respective expected and/or observed traversal frequencies of various paths. The disparity map may be used, for example, to identify paths through the software product that are utilized by users but that are not part of the intended design, paths that are part of the intended design but that are not utilized by users, paths that are over-tested, and/or paths that are under-tested (e.g., untested), among other possibilities. In some cases, each of these different conditions may be indicated graphically as part of the disparity map (e.g., via color coding). Accordingly, the disparity map may provide information that may be used for adjusting the groups of software instructions, the links therebetween, and/or the testing processes thereof. Thus, the disparity map may allow the software product to be updated and/or improved more quickly and in a manner that more accurately matches users' observed behaviors.

Accordingly, a first example embodiment may involve a persistent storage containing a plurality of groups of software instructions. Each respective group of software instructions of the plurality of groups of software instructions may be linked with at least one other group of software instructions of the plurality of groups of software instructions. The first example embodiment may also involve a software application configured to perform operations. The operations may include determining an expected execution map that represents one or more expected paths that are expected to be followed between linked groups of software instructions of the plurality of groups of software instructions. The operations may also include monitoring one or more interactions of a user with the plurality of groups of software instructions and, based on monitoring of the one or more interactions, determining an observed execution map that represents one or more observed paths that the user has followed between the linked groups of software instructions. The operations may additionally include determining a disparity map that represents a disparity between the one or more expected paths and the one or more observed paths by comparing the expected execution map to the observed execution map. The operations may further include displaying one or more of: (i) the expected execution map, (ii) the observed execution map, or (iii) the disparity map.

A second example embodiment may involve determining an expected execution map that represents one or more expected paths that are expected to be followed between linked groups of software instructions of a plurality of groups of software instructions contained in persistent storage. Each respective group of software instructions of the plurality of groups of software instructions may be linked with at least one other group of software instructions of the plurality of groups of software instructions. The second example embodiment may also involve monitoring one or more interactions of a user with the plurality of groups of software instructions and, based on monitoring of the one or more interactions, determining an observed execution map that represents one or more observed paths that the user has followed between the linked groups of software instructions. The second example embodiment may additionally involve determining a disparity map that represents a disparity between the one or more expected paths and the one or more observed paths by comparing the expected execution map to the observed execution map. The second example embodiment may further involve displaying one or more of: (i) the expected execution map, (ii) the observed execution map, or (iii) the disparity map.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

DETAILED DESCRIPTION

Figure 1:
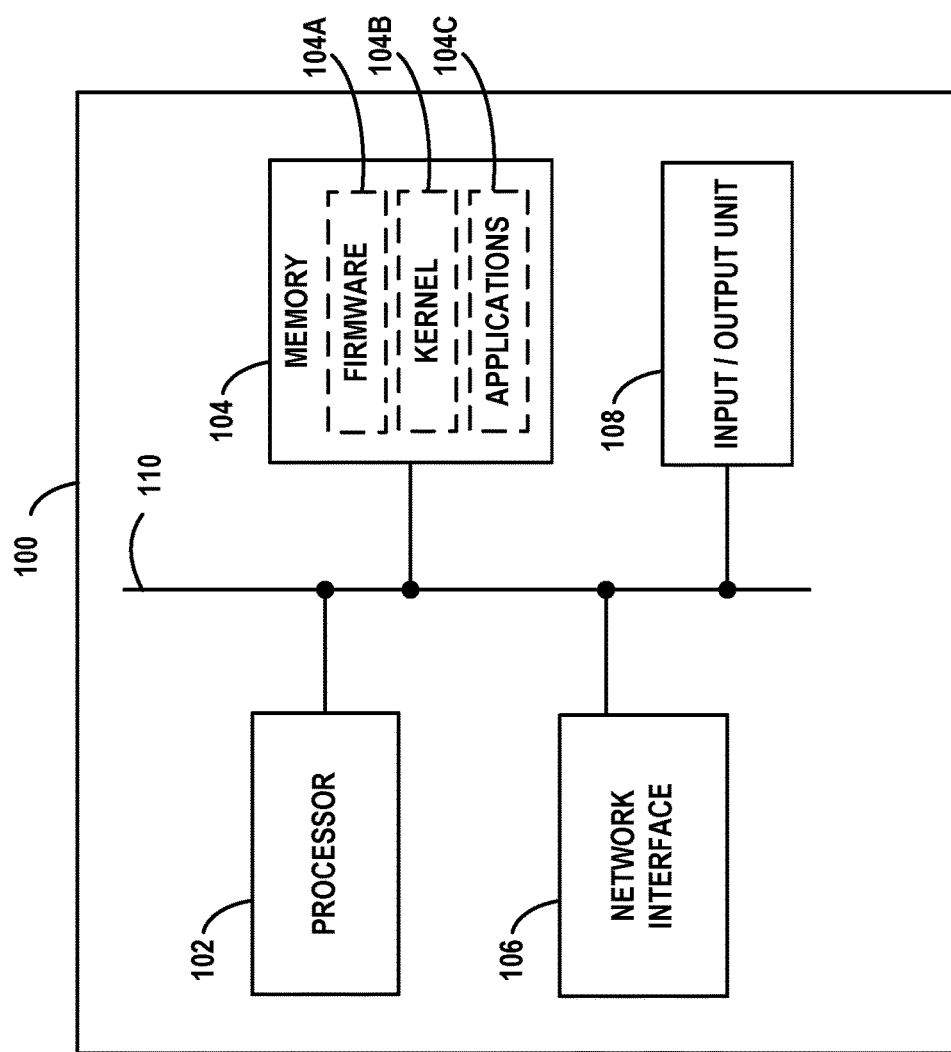
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. Introduction

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation" thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. Example Computing Devices and Cloud-Based Computing Environments

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
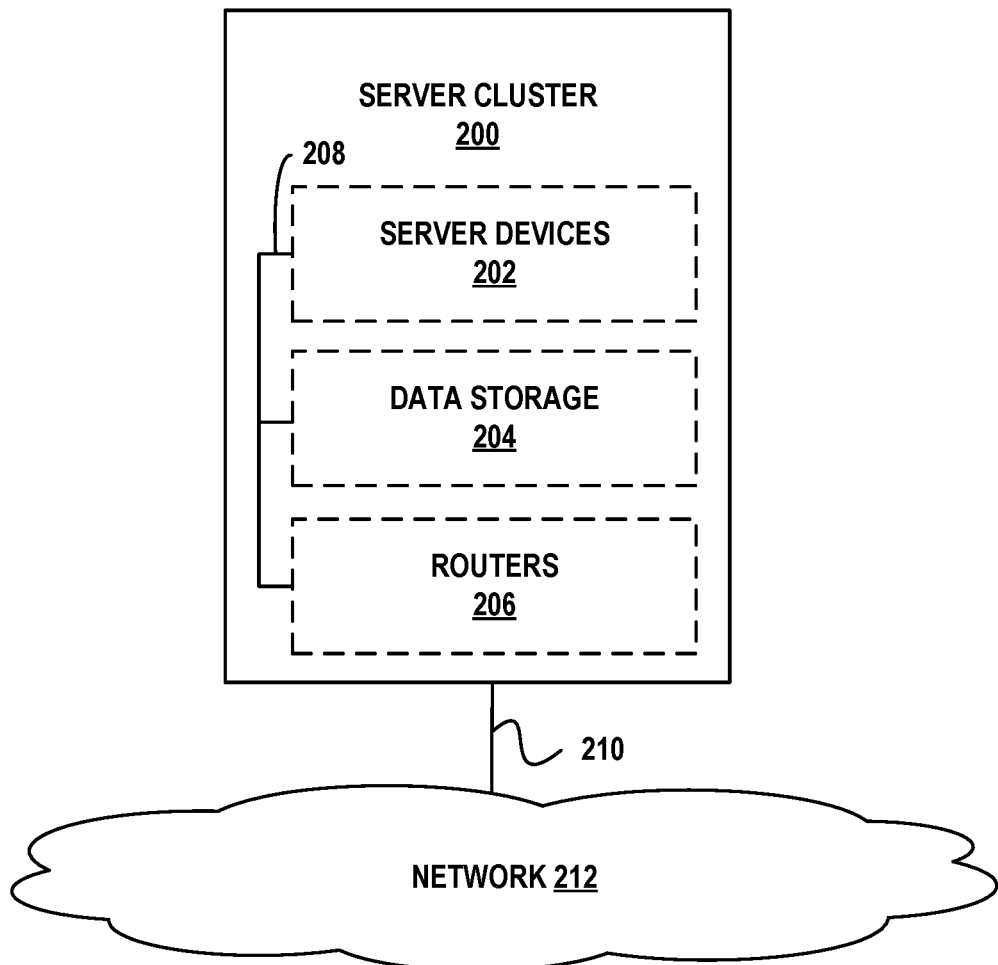
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. Example Remote Network Management Architecture

Figure 3:
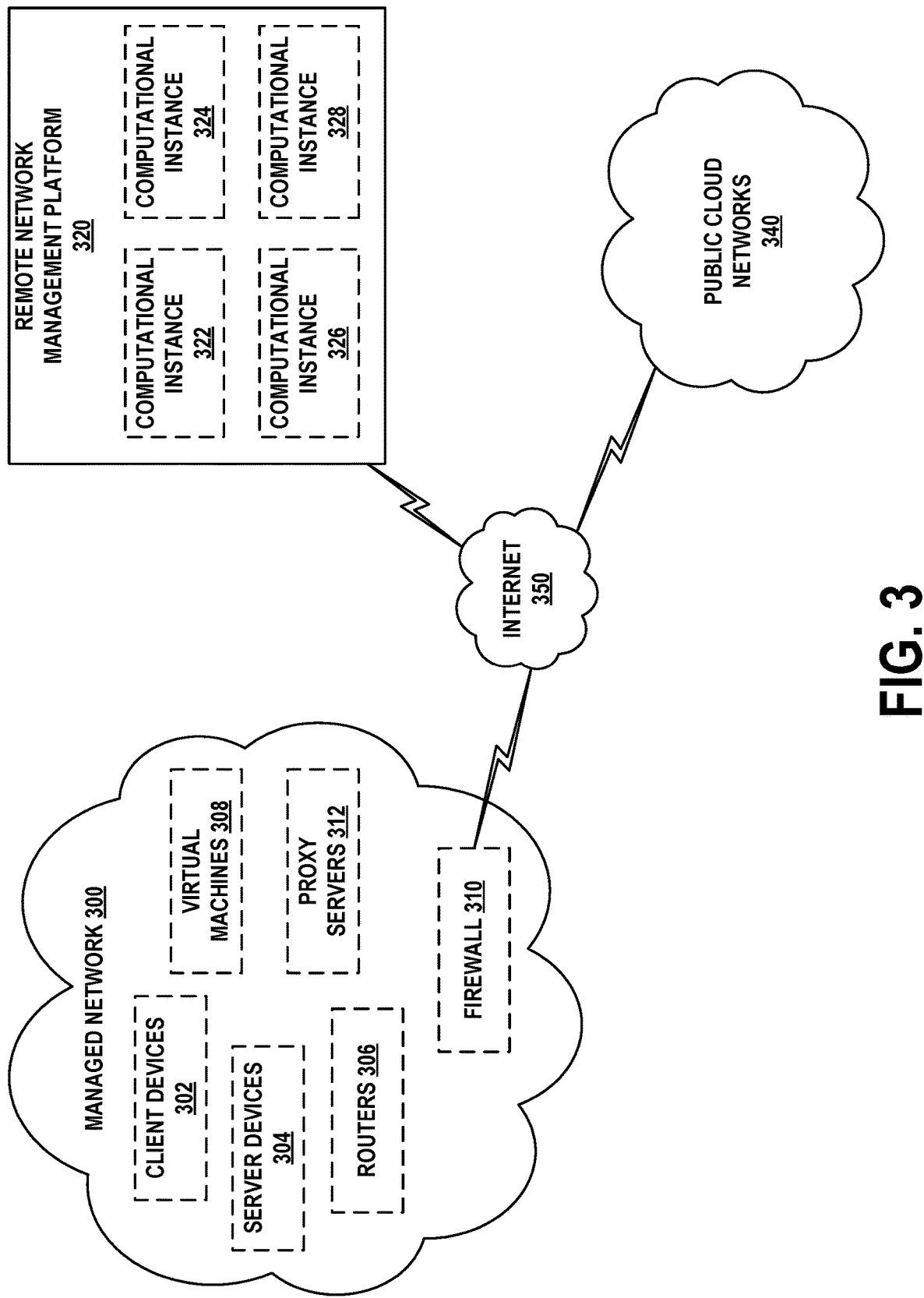
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200) that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
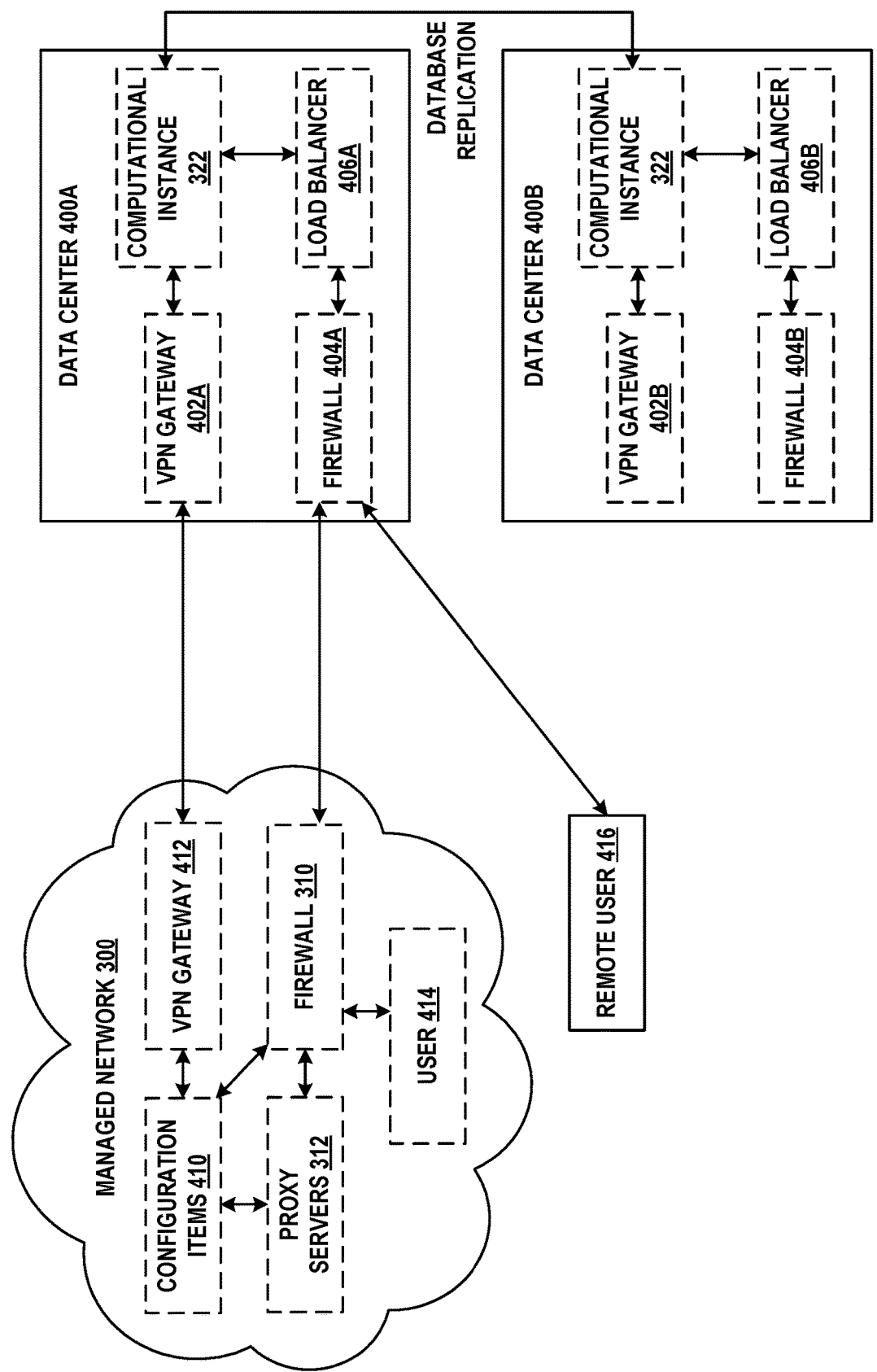
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. Example Device, Application, and Service Discovery

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
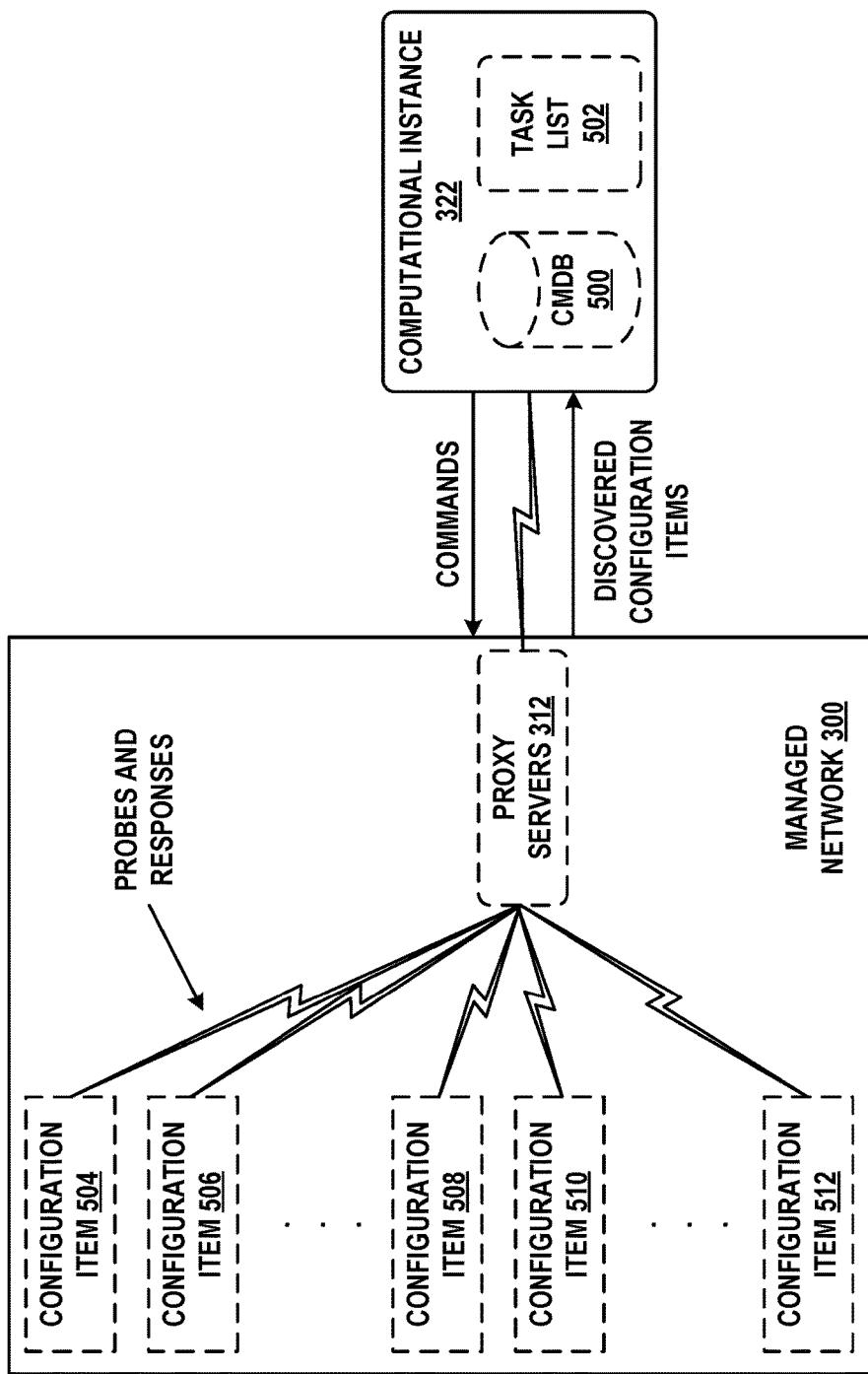
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
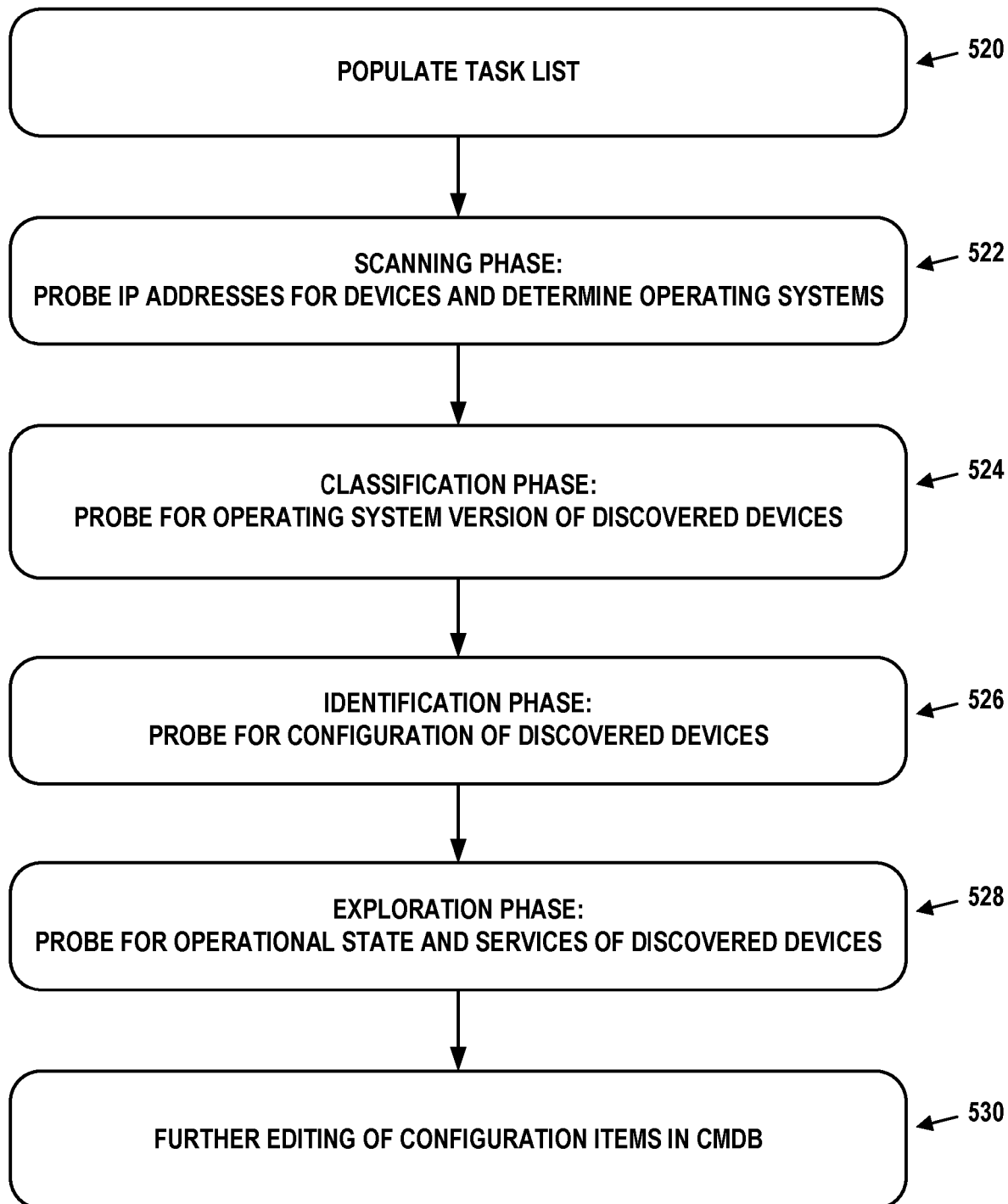
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. Example Expected Execution Map

Aspects of a software product may be designed, developed, tested, and/or otherwise expected to be used in a particular manner. For example, the design, development, and/or testing may focus on and/or establish expected paths that are expected to be followed through groups of software instructions that define the software product. In some cases, these groups of software instructions may additionally provide paths through the software product that might not have been explicitly designed, developed, tested, and/or otherwise intended, but that are nevertheless available for traversal by users. Thus, the actually observed usage of the software product by end users may differ from the expected and/or intended usage of the software product. Accordingly, the expected paths and the observed paths may be determined, mapped, quantified, and/or compared by a software application, and used as a basis for adjusting aspects of the software product and/or the process of testing the software product to facilitate a reduction of the disparity between the expected usage and the observed usage.

Figure 6A:
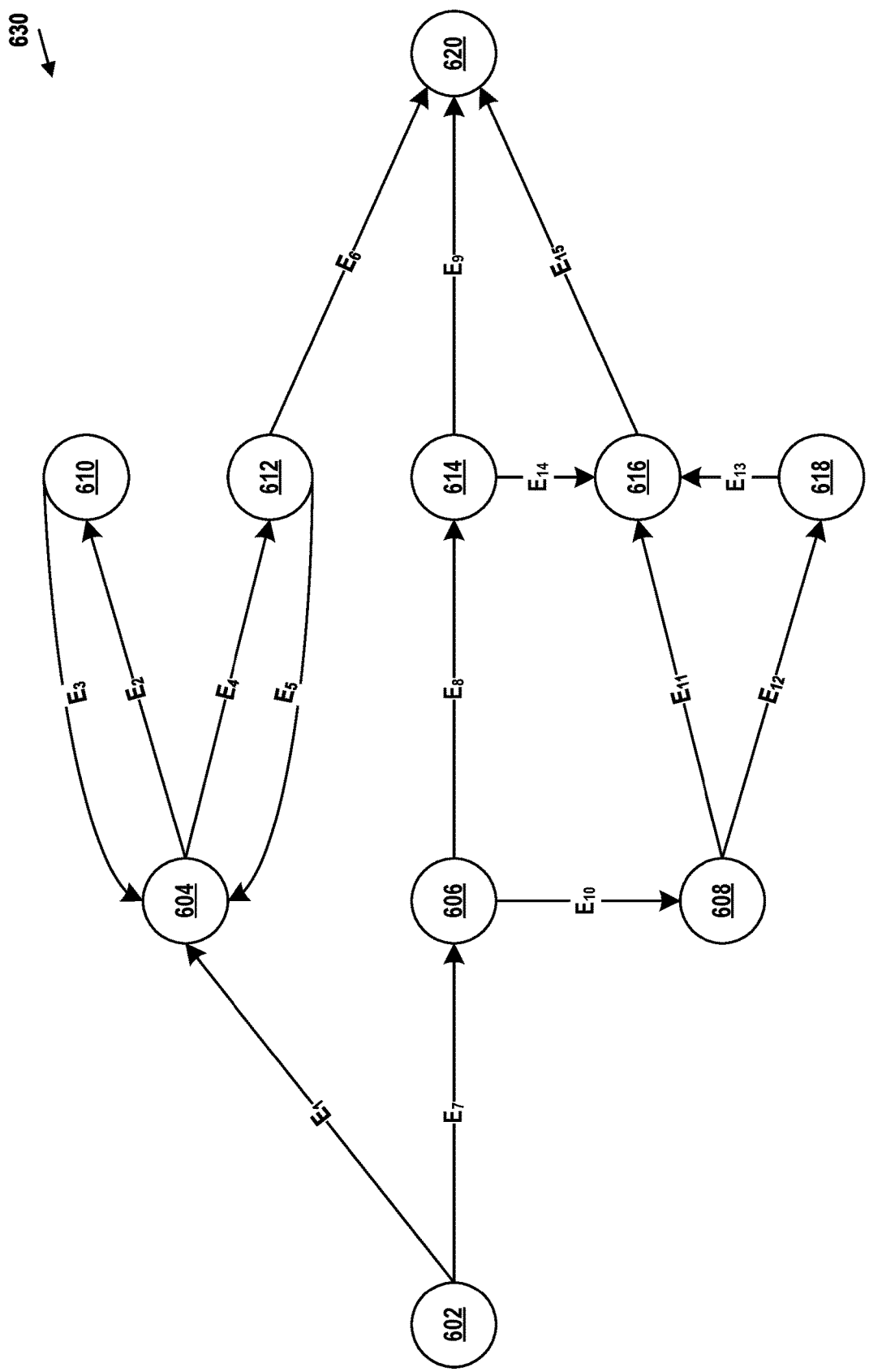
FIG. 6A illustrates aspects of an expected execution map, in accordance with example embodiments.

FIG. 6A illustrates an example expected execution map 630 that may be determined or otherwise obtained by the software application. Expected execution map 630 includes a plurality of nodes each representing a corresponding group of software instructions of a software product. Expected execution map 630 also includes a plurality of links, which may alternatively be referred to as connections and/or edges, between the nodes. The plurality of links indicates how the groups of software instructions are expected to link, connect, and/or otherwise relate to one another. In particular, the plurality of links in expected execution map 630 may indicate expected paths that are expected to be followed between the groups of software instructions represented thereby. Expected execution map 630 may be defined manually, and/or may be determined by tracing the execution of software tests against the software product. The expected paths may differ from paths that are actually followed by one or more users while interacting with the software product.

Specifically, expected execution map 630 includes nodes 602, 604, 606, 608, 610, 612, 614, 616, 618, and 620 (i.e., nodes 602-620). Each node may represent a corresponding group of software instructions. The groups of software instructions represented by nodes 602—620 may, collectively, define at least part of a software product. For example, each respective node of nodes 602-620 may represent a software function and/or a grouping of one or more software functions, such as, for example, a class, a method, a procedure, a web page, a user interface (UI) component, and/or another collection of software instructions configured to perform one or more corresponding operations. The software product may comprise one or more native software applications, web-based software applications, and/or hybrid software applications, among other possibilities.

Expected execution map 630 shows that node 602 links to nodes 604 and 606, node 604 links to nodes 610 and 612, node 610 links back to node 604, node 612 links back to node 604 and also links to node 620, node 606 links to nodes 614 and 608, node 614 links to nodes 616 and 620, node 608 links to nodes 616 and 618, node 618 links to node 616, and node 616 links to node 620. Each of the links shown in map 630 (and in the other maps shown herein) is unidirectional, as indicated by the corresponding directions of the arrows showing the links.

Node 602 may represent a corresponding group of software instructions that provide a starting point within the software product. Node 602 may thus be associated with, for example, a log-in screen, a welcome screen, a home screen, and/or another screen from which user interaction with the software product is initiated. Node 620 may represent a corresponding group of software instructions that provide an ending point within the software product. Node 620 may thus be associated with, for example, a log-out screen, an exit/quit button or screen, and/or another screen and/or interactive component that allows the user to exit, terminate, and/or pause execution of the software product. Nodes 604-618 may represent groups of software instructions that provide various operations and/or functionality of the software product.

That is, each respective link shows that a first node from which the respective link extends (i.e., from which the corresponding arrow originates) represents a first group of software instructions configured to allow for invocation of execution of a second group of software instructions represented by a second node to which the respective link extends (i.e., to which the corresponding arrow points).

For example, expected execution map 630 may represent a software application, and nodes 602-620 may represent various functions of the software application. Thus, for example, node 604 may link to nodes 610 and 612 in that a function represented by node 604 may include a first statement calling/invoking a first function represented by node 610 and a second statement calling/invoking a second function represented by node 612. Functions represented by other nodes of nodes 602-620 may be similarly linked by way of such statements.

In another example, expected execution map 630 may represent a website, and nodes 602-620 may represent various web pages of the website. Thus, for example, node 606 may link to nodes 608 and 614 in that a web page represented by node 606 may include a first hyperlink to a first web page represented by node 614 and a second hyperlink to a second web page represented by node 608. Web pages represented by other nodes of nodes 602-620 may be similarly linked by way of hyperlinks.

In a further example, expected execution map 630 may represent a GUI, and nodes 602-620 may represent various UI components of the GUI. Thus, for example, node 608 may link to nodes 616 and 618 in that a UI component represented by node 608 may include and/or be associated with (i) a first script configured to modify and/or interact with (e.g., cause the display of, alter the appearance of, alter the content of, etc.) a first UI component represented by node 616 and (ii) a second script configured to modify and/or interact with a second UI component represented by node 618. UI components represented by other nodes of nodes 602-620 may be similarly linked by way of such scripts.

In some cases, nodes 602-620 may represent a combination of functions, web pages, UI components, and/or other units of software instructions, and may thus be linked through a combination of function statements, hyperlinks, scripts, and/or other software constructs.

Each respective link of the plurality of links represented by expected execution map 630 may be associated with one or more corresponding values indicative of how frequently the respective link is expected to be traversed. Specifically, the link from node 602 to node 604 may be associated with a value $E_1$, the link from node 604 to node 610 may be associated with a value $E_2$, the link from node 610 to node 604 may be associated with a value $E_3$, the link from node 604 to node 612 may be associated with a value $E_4$, the link from node 612 to node 604 may be associated with a value $E_5$, the link from node 612 to node 620 may be associated with a value $E_6$, the link from node 602 to node 606 may be associated with a value $E_7$, the link from node 606 to node 614 may be associated with a value $E_8$, the link from node 614 to node 620 may be associated with a value $E_9$, the link from node 606 to node 608 may be associated with a value $E_{10}$, the link from node 608 to node 616 may be associated with a value $E_{11}$, the link from node 608 to node 618 may be associated with a value $E_{12}$, the link from node 618 to node 616 may be associated with a value $E_{13}$, the link from node 614 to node 616 may be associated with a value $E_{14}$, and the link from node 616 to node 620 may be associated with a value $E_{15}$.

In some implementations, the values $E_1$-$E_{15}$ may each explicitly indicate how frequently the corresponding links are expected to be traversed. For example, each of the values $E_1$-$E_{15}$ may represent the traversal frequency of a corresponding link as a percent chance of traversal per session or visit, and/or a number of traversals per unit of time, among other possibilities. Alternatively or additionally, the values $E_1$-$E_{15}$ may implicitly indicate how frequently the respective links are expected to be traversed. For example, each of the values $E_1$-$E_{15}$ may represent a total number of times the corresponding link has been traversed during a particular period of time (e.g., since the software product was released to end users). Thus, the values $E_1$-$E_{15}$ may quantify how often the different groups of software instructions are expected to be used to link to one another. In some cases, each respective value of the values $E_1$-$E_{15}$ may include a plurality of values, each indicating the expected traversal frequency in a different manner.

An expected path through the software product may include one or more links between nodes 602-620 of expected execution map 630. In some implementations, each expected path may consist of a single corresponding link of expected execution map 630. Thus, each path may represent a single hop from a first node to a second node of expected execution map 630. Accordingly, the links may be considered to be independent of one another in that the one or more values associated with a respective link may be independent of the history of links followed to reach the respective link.

In other implementations, each expected path may consist of a series of two or more corresponding links of expected execution map 630. Thus, each path may represent multiple hops between at least three nodes of expected execution map 630. Accordingly, the links may be considered to be dependent on one another in that the one or more values associated with a respective link may depend on the history of links followed to reach the respective link.

For example, a first path may include a traversal from node 602, to node 604, to node 612, to node 620, while a second path may include a traversal from node 602 to node 604, to node 610, to node 604, to node 612, to node 620. Thus, expected execution map 630 may be configured to track (i) the expected, history-independent traversal frequency of individual links involved in the first path and the second path, (ii) the expected, history-dependent traversal frequency of the individual links conditioned on the series of links followed to reach a corresponding node and/or (iii) a respective expected traversal frequency associated with each of the first path and the second path. Accordingly, each respective value of the values $E_1$-$E_{15}$ may include a plurality of values to represent the expected traversal frequency for individual links and/or multi-links paths.

Determining the expected traversal frequency of a multi-link path may allow for additional insights into operation of the software product, since traversal of different multi-link paths may involve different dependencies that might not be accounted for by tracking links independently. For example, in following the second path, the group of software instructions represented by node 612 may perform operations based on data that was generated and/or modified by the group of software instructions represented by node 610, thus giving rise to a dependency that is not observed when following the first path. Thus, a comparison between expected multi-links paths and observed multi-link paths may allow the software application to identify disparities that might not be apparent at the level of individual links.

VI. Example Observed Execution Map

Figure 6B:
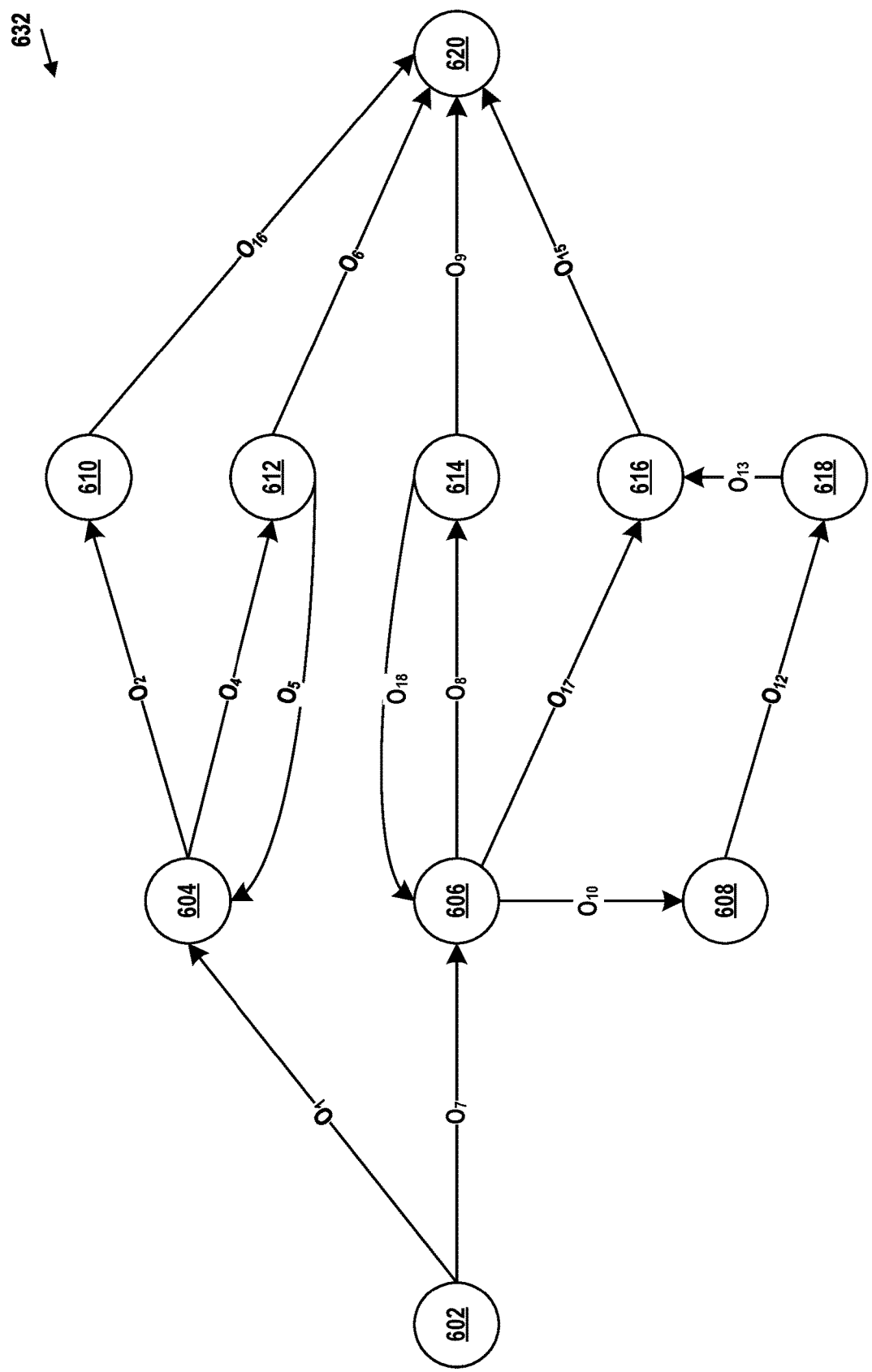
FIG. 6B illustrates aspects of an observed execution map, in accordance with example embodiments.

FIG. 6B illustrates an example observed execution map 632 that may be determined or otherwise obtained by the software application. Observed execution map 632 corresponds to expected execution map 630 in that both maps represent groups of software instructions of the same software product. Observed execution map 632 may thus include at least some of the same nodes and links as expected execution map 630 and, in some cases, may include additional nodes that are not part of expected execution map 630.

In particular, the nodes and links of observed execution map 632 indicate how the groups of software instructions have been observed to actually link to one another when the software product is used by a user. In particular, the plurality of links in observed execution map 632 may indicate observed paths that have actually been followed by one or more users between the groups of software instructions represented thereby. Observed execution map 632 may be determined by tracing usage of the software product by end users. The observed paths of observed execution map 632 may differ from the expected paths of expected execution map 630, as is the case in FIG. 6B.

The usage may be traced by way of execution records described below and/or various types of logging carried out by the groups of software instructions. For example, each group of software instructions may write to a log when it is entered, is exited, calls a function or method, and/or resumes execution after a function or method call. From these logs, the order in which the groups of software instructions were executed can be determined.

Specifically, observed execution map 632 includes nodes 602-620, each representing a corresponding group of software instructions. Nodes 602-620 of observed execution map 632 may correspond to and represent the same groups of software instructions as nodes 602-620 of expected execution map 630.

Like expected execution map 630, observed execution map 632 shows that node 602 links to nodes 604 and 606, node 604 links to nodes 610 and 612, node 612 links back to node 604 and also links to node 620, node 606 links to nodes 614 and 608, node 608 links to node 618, node 618 links to node 616, and node 616 links to node 620. Unlike expected execution map 630, observed execution map 632 does not show node 610 linking back to node 604, node 614 linking to node 616, or node 608 linking to node 616. Additionally, unlike expected execution map 630, observed execution map 632 shows that node 614 links back to node 606, node 610 links to node 620, and node 606 links to node 616. Thus, the respective sets of links and/or paths of expected execution map 630 and observed execution map 632 differ from one another, thereby indicating that the expected usage of the software product differs from actual usage of the software product.

Each respective link of the plurality of links represented by observed execution map 632 may be associated with one or more corresponding values indicative of how frequently the respective link has actually been traversed. Specifically, the link from node 602 to node 604 may be associated with a value $O_1$, the link from node 604 to node 610 may be associated with a value $O_2$, the link from node 604 to node 612 may be associated with a value $O_4$, the link from node 612 to node 604 may be associated with a value $O_5$, the link from node 612 to node 620 may be associated with a value $O_6$, the link from node 602 to node 606 may be associated with a value $O_7$, the link from node 606 to node 614 may be associated with a value $O_8$, the link from node 614 to node 620 may be associated with a value $O_9$, the link from node 606 to node 608 may be associated with a value $O_{10}$, the link from node 608 to node 618 may be associated with a value $O_{12}$, the link from node 618 to node 616 may be associated with a value $O_{13}$, and the link from node 616 to node 620 may be associated with a value $O_{15}$.

The links from node 610 to node 604, from node 608 to node 616, and from node 614 to node 616 (not shown in map 632) may be associated, respectively, with values $O_3$, $O_{14}$, and $O_{11}$ equal to zero. Such association may be implicit in the omission of these links from map 632, or explicit in storage of a respective zero value in association with each of these links. Additionally, the link from node 610 to node 620 may be associated with a value $O_{16}$, the link from node 606 to node 616 may be associated with a value $O_{17}$, and the link from node 614 to node 606 may be associated with a value $O_{18}$. The links from node 610 to node 620, from node 606 to node 616, and from node 614 to node 606 may also be associated either explicitly or implicitly, with values $E_{16}$-$E_{18}$ (not shown in map 630, and corresponding to the values $O_{16}$-$O_{18}$) equal to zero.

Values $O_1$-$O_{18}$ may each indicate, explicitly and/or implicitly, how frequently the respective links have actually been traversed. Values $O_1$-$O_{18}$ may differ from values $E_1$-$E_{15}$ in magnitude, but both sets of values may represent, in the same or similar manner, the same or similar metrics concerning traversal of groups of software instructions of a software product. In addition to tracking the traversal frequency of individual links, observed execution map 632 may also be configured to track a respective traversal frequency associated with each multi-link path observed through the software product. Since the respective values associated with the links and/or paths of expected execution map 630 and observed execution map 632 may differ from one another, quantifying a disparity between these maps may indicate an extent to which the expected usage of the software product differs from actual usage of the software product.

VII. Example Disparity Map

Figure 6C:
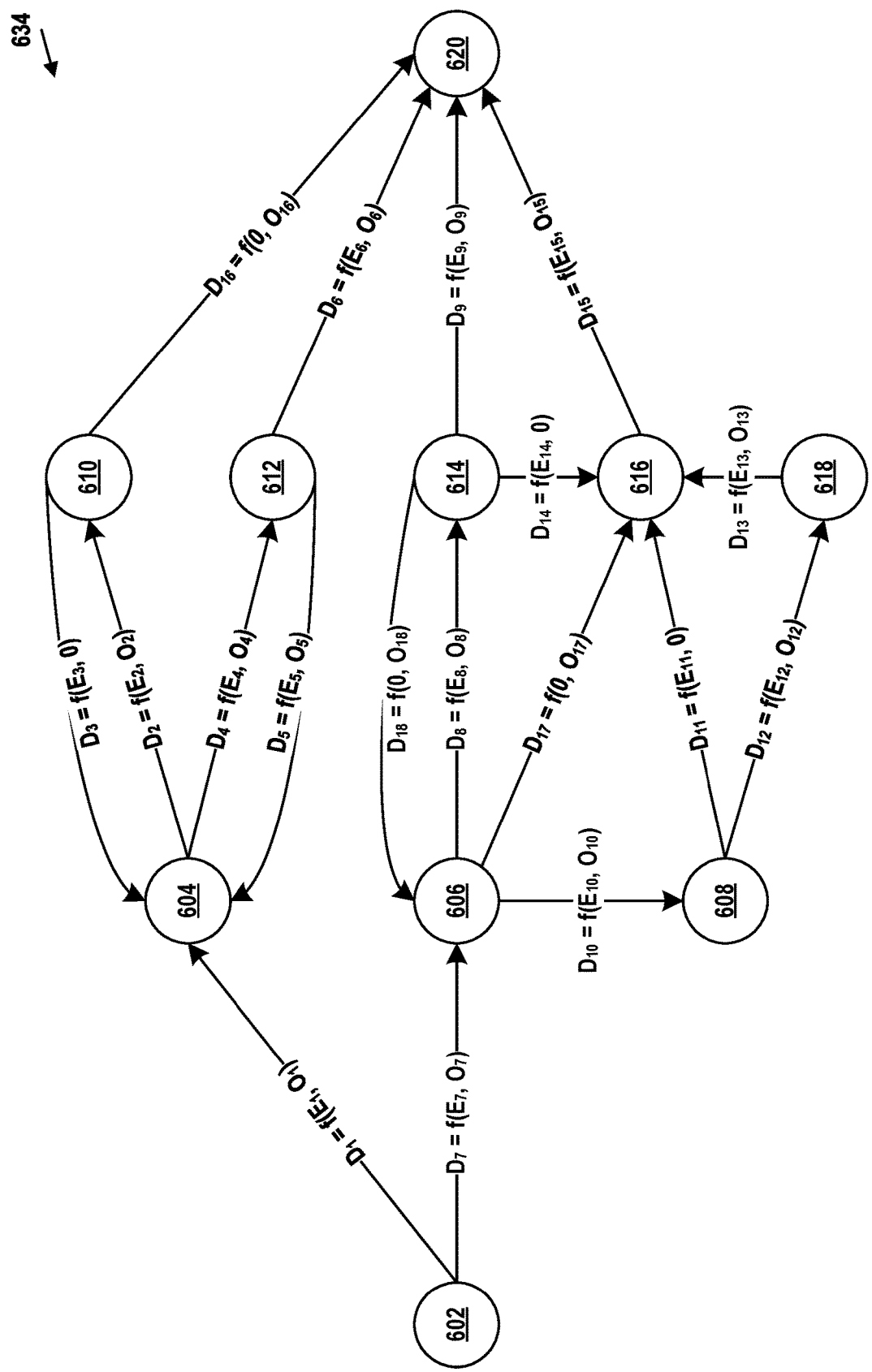
FIGS. 6C, 6D, 6E, and 6F illustrate aspects of a disparity map, in accordance with example embodiments.

FIG. 6C illustrates an example disparity map 634 that may be determined by the software application. Disparity map 634 may represent a disparity (e.g., difference, quotient, or some other metric of divergence) between observed execution map 632 and expected execution map 630, and may thus include some of the same nodes and links as maps 630 and 632. In particular, the nodes and links of disparity map 634 indicate a disparity between (i) how the groups of software instructions are and/or were expected to be used to link to one another and (ii) how the groups of software instructions have been observed to actually link to one another when the software product is used by a user. In particular, disparity map 634 may quantify differences between expected paths that are expected to be followed between the groups of software instructions and observed paths that have actually been followed by one or more users between the groups of software instructions.

Specifically, disparity map 634 includes nodes 602-620, each representing a corresponding group of software instructions. Nodes 602-620 of disparity map 634 may correspond to and represent the same groups of software instructions as nodes 602-620 of expected execution map 630 and observed execution map 632. Disparity map 634 also includes the links shown in expected execution map 630 and in observed execution map 632. Thus, the nodes and links shown in disparity map 634 are a union of the nodes and links shown in expected execution map 630 and in observed execution map 632.

Each respective link of the plurality of links represented by disparity map 634 may be associated with one or more corresponding values indicative of a disparity between (i) how frequently the respective link is expected to be traversed and (ii) how frequently the respective link has actually been traversed. Specifically, the link from node 602 to node 604 may be associated with a value $D_1=f(E_1, O_1)$, the link from node 604 to node 610 may be associated with a value $D_2=f(E_2, O_2)$, the link from node 610 to node 604 may be associated with a value $D_3=f(E_3, O_3=0)$, the link from node 604 to node 612 may be associated with a value $D_4=f(E_4, O_4)$, the link from node 612 to node 604 may be associated with a value $D_5=f(E_5, O_5)$, the link from node 612 to node 620 may be associated with a value $D_6=f(E_6, O_6)$, the link from node 602 to node 606 may be associated with a value $D_7=f(E_7, O_7)$, the link from node 606 to node 614 may be associated with a value $D_8=f(E_8, O_8)$, the link from node 614 to node 620 may be associated with a value $D_9=f(E_9, O_9)$, the link from node 606 to node 608 may be associated with a value $D_{10}=f(E_{10}, O_{10})$, the link from node 608 to node 616 may be associated with a value $D_{11}=f(E_{11}, O_{11}=0)$, the link from node 608 to node 618 may be associated with a value $D_{12}=f(E_{12}, O_{12})$, the link from node 618 to node 616 may be associated with a value $D_{13}=f(E_{13}, O_{13})$, the link from node 614 to node 616 may be associated with a value $D_{14}=f(E_{14}, O_{14}=0)$, the link from node 616 to node 620 may be associated with a value $D_{15}=f(E_{15}, O_{15})$, the link from node 610 to node 620 may be associated with a value $D_{16}=f(E_{16}=0, O_{16})$, the link from node 606 to node 616 may be associated with a value $D_{17}=f(E_{17}=0, O_{17})$, and the link from node 614 to node 606 may be associated with a value $D_{18}=f(E_{18}=0, O_{18})$.

The function $f(E_N, O_N)$ may be any combination of one or more mathematical operations that quantifies a disparity between the expected value associated with the Nth link and the observed value associated with the Nth link. In one example, $f(E_N, O_N)=E_N/O_N$, $f(E_N, O_N)=O_N/E_N$, $f(E_N, O_N)=E_N/(O_N+1)$, and/or $f(E_N, O_N)=O_N/(E_N+1)$ may quantify the disparity by way of a quotient based on the expected value and the observed value, or vice versa, for the Nth link. In another example, $f(E_N, O_N)=E_N-O_N$ and/or $f(E_N, O_N)=O_N-E_N$ may quantify the disparity by way of a difference based on the expected value and the observed value for the Nth link.

Thus, values $D_1$-$D_{18}$ may each indicate, explicitly and/or implicitly, a disparity between (i) how frequently the respective links are expected to be traversed and (ii) how frequently the respective links have actually been traversed. In addition to representing the disparity in the traversal frequency of individual links, disparity map 634 may also be configured to represent the disparity between (i) the respective expected traversal frequency associated with each multi-link path through the software product and (ii) the respective observed traversal frequency associated with each multi-link path through the software product. In some cases, each respective value of the values $D_1$-$D_{18}$ may include a plurality of values to represent the disparity for individual links and/or multi-link paths in one or more different manners.

Figure 6D:
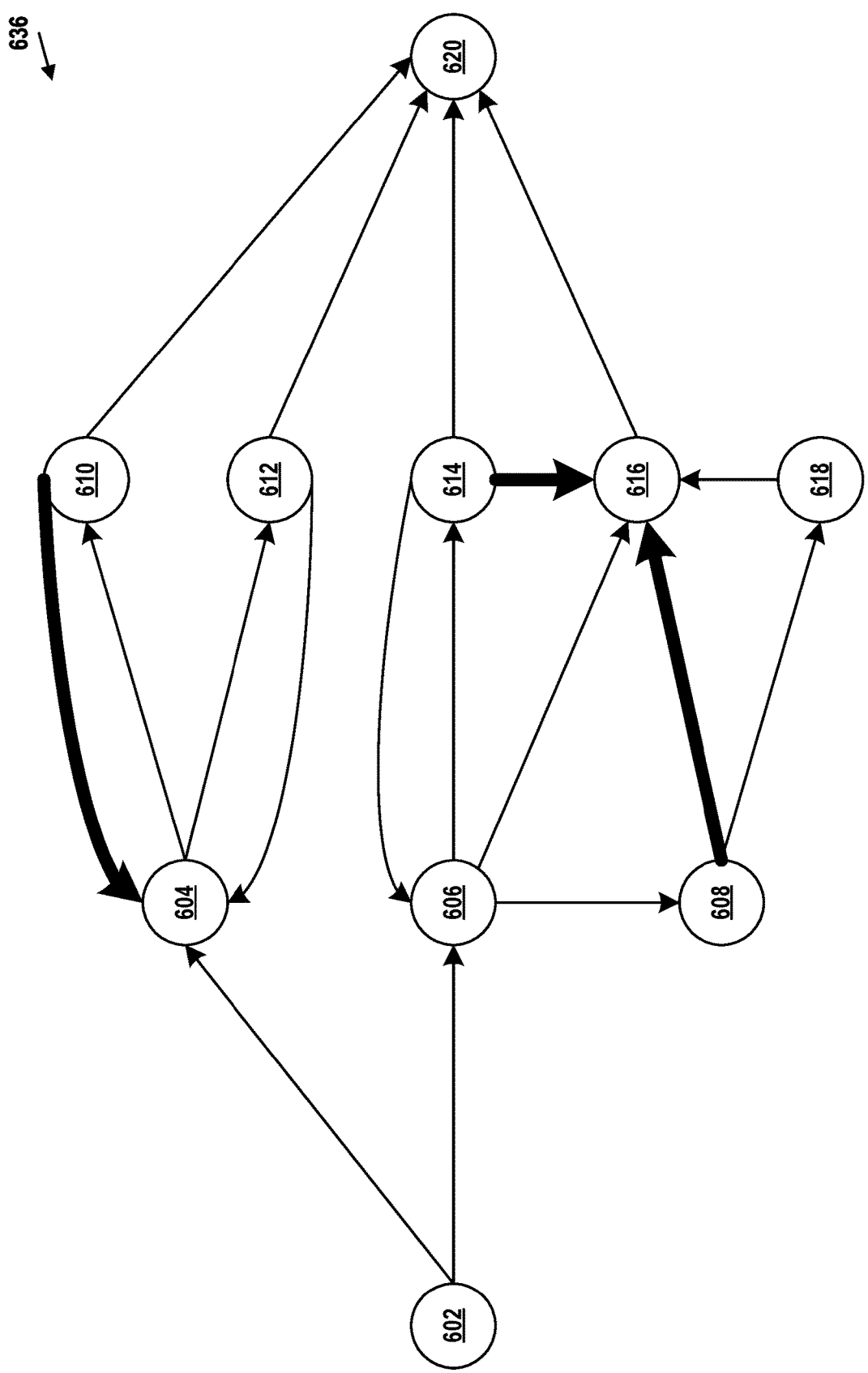
Figure 6E:
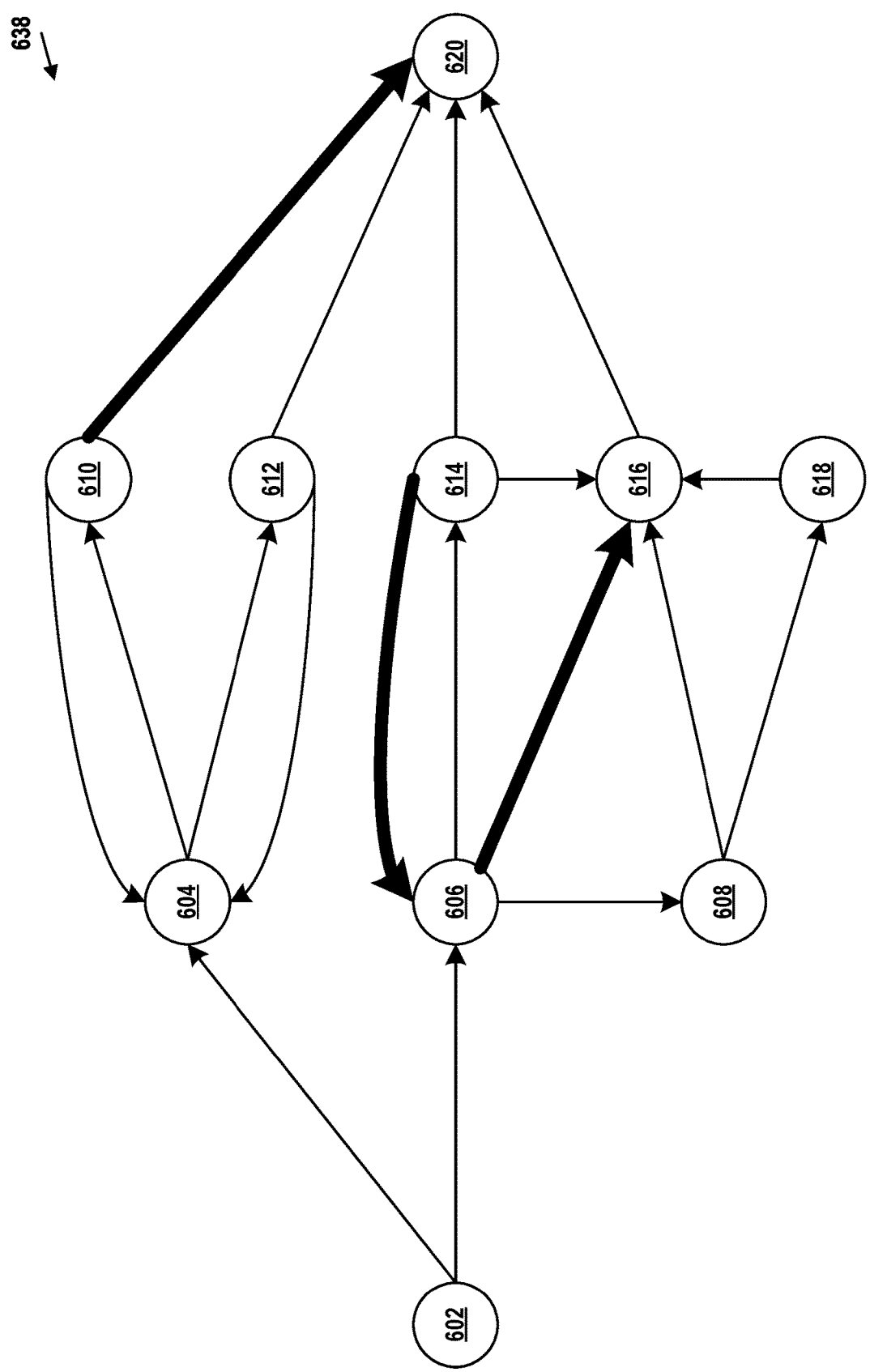
Figure 6F:
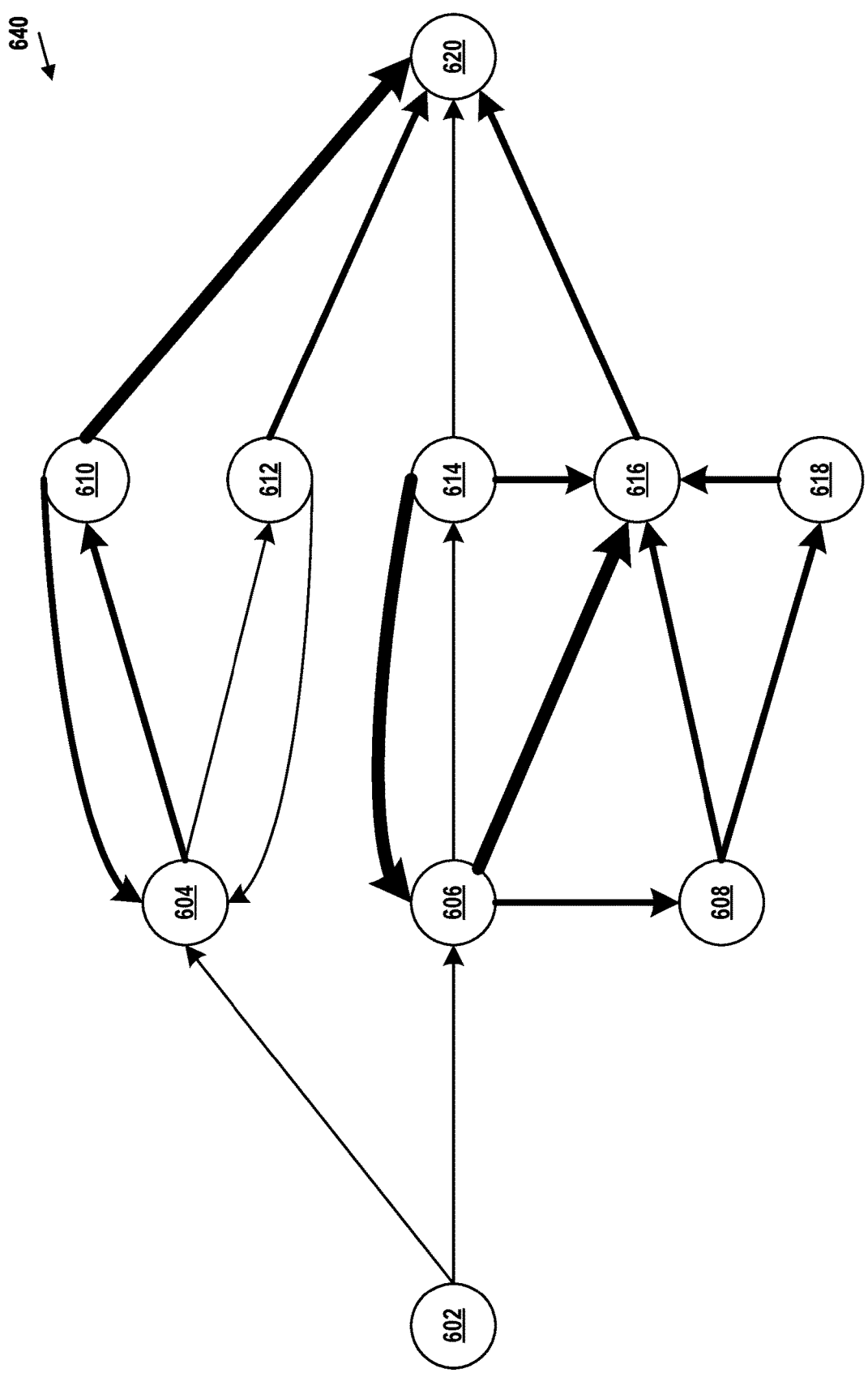

FIGS. 6D, 6E, and 6F illustrate example visual representations of aspects of the information represented by disparity map 634. Specifically, FIG. 6D illustrates disparity map 636, which provides a visual representation of links in disparity map 634 that are not actually utilized by users. Specifically, disparity map 636 illustrates, using bolded arrows, links that have been expected to be traversed by users (and are thus present in expected execution map 630) but that have not actually been observed to be traversed by users (and are thus absent from observed execution map 632). In particular, disparity map 636 shows that (i) the link from node 610 to node 604 (where $O_3=0$ and $E_3>0$), (ii) the link from node 608 to node 616 (where $O_{11}=0$ and $E_{11}>0$), and (iii) the link from node 614 to node 616 (where $O_{14}=0$ and $E_{14}>0$), are and/or were expected to be traversed, but have not actually been traversed by users during the period of time represented by disparity map 636. Thus, the software application may be configured to bold an Nth link as part of disparity map 636 when $O_N=0$ and $E_N>0$, and/or when the value of $D_N$ is indicative of this condition.

FIG. 6E illustrates disparity map 638, which provides a visual representation of paths in disparity map 634 that were not and/or are not expected to be used by users. Specifically, disparity map 638 illustrates, using bolded arrows, links that have not been expected to be traversed by users (and are thus absent from expected execution map 630, although these links were provided as part of the software product) but that have actually been observed to be traversed by users (and are thus present in observed execution map 632). In particular, disparity map 638 shows that (i) the link from node 610 to node 620 (where $O_{16}>0$ and $E_{16}=0$), (ii) the link from node 606 to node 616 (where $O_{17}>0$ and $E_{17}=0$), and (iii) the link from node 614 to node 606 (where $O_{18}>0$ and $E_{18}=0$), were not expected to be traversed, but have been traversed by users during the period of time represented by disparity map 638. Thus, the software application may be configured to bold an Nth link as part of disparity map 638 when $O_N>0$ and $E_N=0$, and/or when the value of $D_N$ is indicative of this condition.

FIG. 6F illustrates disparity map 640, which provides a visual representation of the respective values associated with the links in disparity map 634. Specifically, disparity map 640 visually illustrates, using the line weight of the arrows therein, the disparity between (i) an extent to which the links have been expected to be traversed by users and (ii) an extent to which the links have actually been observed to be traversed by users. Thus, disparity map 640 shows (i), using a first, thin line weight, links that were actually traversed by users less frequently than intended (e.g., node 602 to node 606, where $T_1<D_7<T_2$ when $D_7=O_7/(1+E_7)$), (ii), using a second, medium line weight, links that were actually traversed by users at approximately the same frequency as intended (e.g., node 606 to node 608, where $T_2<D_{10}<T_3$ when $D_{10}=O_{10}/(1+E_{10})$), and (iii), using a third, thick line weight, links that were actually traversed by users more frequently than intended (e.g., node 610 to node 620, where $T_3<D_{16}<T_4$ when $D_{16}=O_{16}/(1+E_{16})$). Disparity map 640 may thus represent or approximate a Sankey diagram. Thus, the software application may be configured to determine the line weight of an Nth link in disparity map 640 based on the value of $D_N$.

While, for clarity of illustration, disparity map 640 discretizes the values associated with links into three different line weights (e.g., defined by corresponding thresholds $T_1<T_2<T_3<T_4$), the values may alternatively be discretized into a different number of line weights (e.g., 5, 10, 20, 40, 50, 100, 500, etc.). Accordingly, additional and/or different corresponding thresholds may be used to discretize the values of $D_N$. Additionally, the corresponding thresholds may vary depending on the specific function used to compute $D_N$. Further, while disparity map 640 uses line weight to visually indicate the magnitude of the values associated with the links, the values may additionally and/or alternatively be represented using numerical values, colors, line patterns, and/or other visual attributes.

In some implementations, disparity map 636, disparity map 638, and/or disparity map 640 may be generated automatically by the software application based on the information in disparity map 634. Disparity map 636 may indicate (e.g., to a programmer, designer, tester, or other individual) parts of the software product that were expected to be utilized, but are not actually utilized, by end users. Similarly, disparity map 638 may indicate (e.g., to the programmer, designer, tester, or other individual) the parts of the software product that are actually utilized by end users, but that were not explicitly designed, programmed, tested, and/or otherwise expected to be utilized by end users. Disparity map 640 may indicate (e.g., to the programmer, designer, tester, or other individual) the quantitative disparity between the expected utilization and actual utilization of parts of the software product. Thus, disparity maps 634, 636, 638, and/or 640 may be used as a basis for adjusting one or more of the groups of software instructions that define the software product, and/or adjusting testing of the software product, among other possibilities.

In a first example, disparity map 636 may be used as a basis for determining to reduce the extent of testing of the bolded links therein and/or entirely remove the bolded links from the software product (since these links are not used). In another example, disparity map 638 may be used as a basis for determining to increase an extent of testing of the bolded links therein (so that links used by users are evaluated better in preparation for use) and/or entirely remove these bolded links from the software product (so that untested links are not available for users). In further example, disparity map 640 may be used as a basis for determining an extent by which testing of certain links is to be increased or decreased.

The determinations to adjust the software instructions of the software product and/or testing of the software product may be performed by, for example, the programmer, designer, and/or tester, based on a manual review of disparity map 634, 636, 638, and/or 640. Alternatively or additionally, the determinations to adjust the software instructions of the software product and/or testing of the software product may be performed automatically by the software application that generated these disparity maps. For example, the software application may be configured to suggest and/or perform a modification of one or more of the groups of software instructions to remove one or more links therebetween. Additionally or alternatively, the software application may be configured to suggest and/or perform a modification of one or more tests to configure these one or more tests to transition among corresponding groups of software instructions using links that have not been tested and/or have been under-tested.

VIII. Example Operations for Map Generation

Figure 7A:
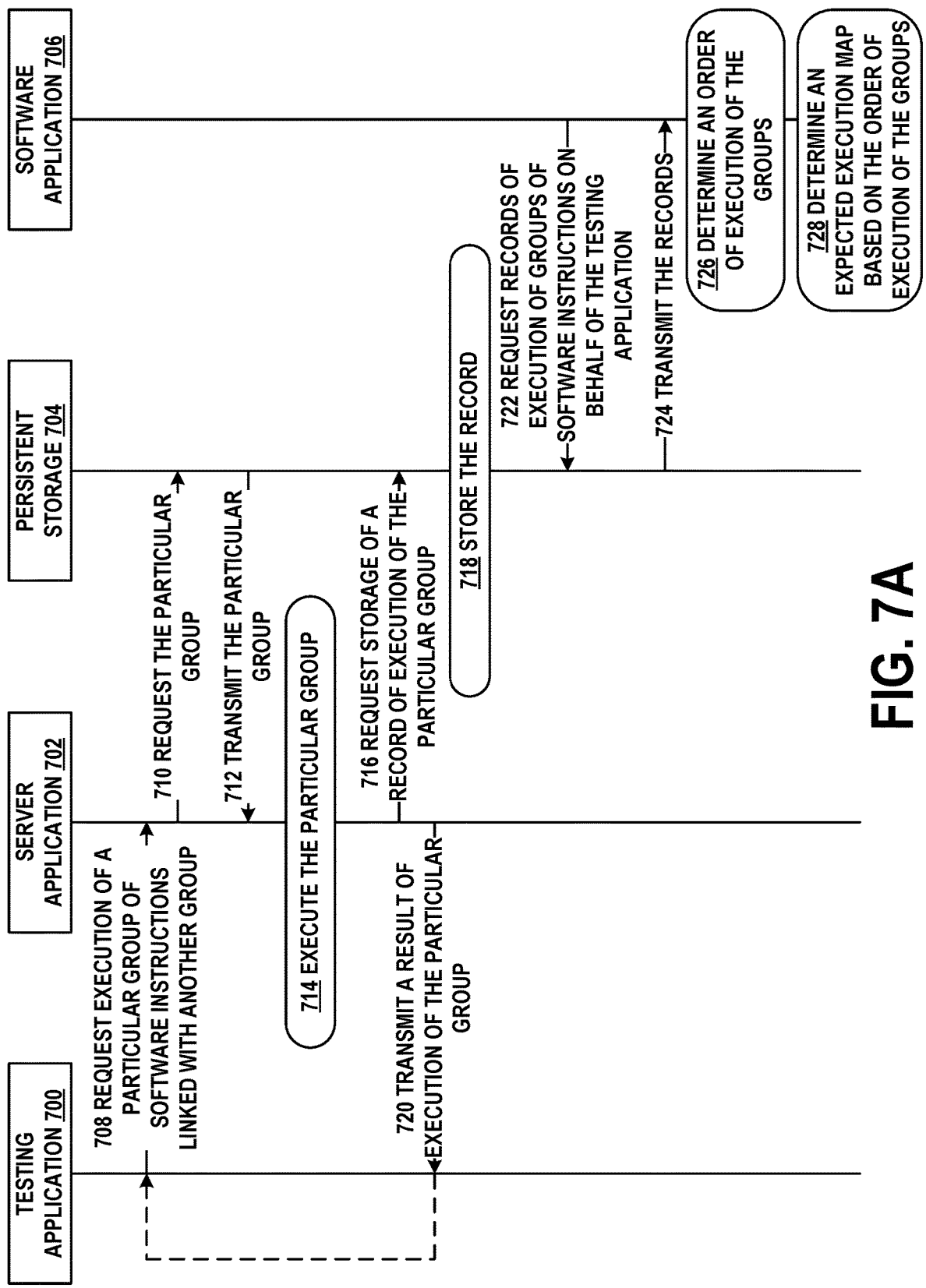
FIGS. 7A, 7B, and 7C are message flow diagrams, in accordance with example embodiments.
Figure 7B:
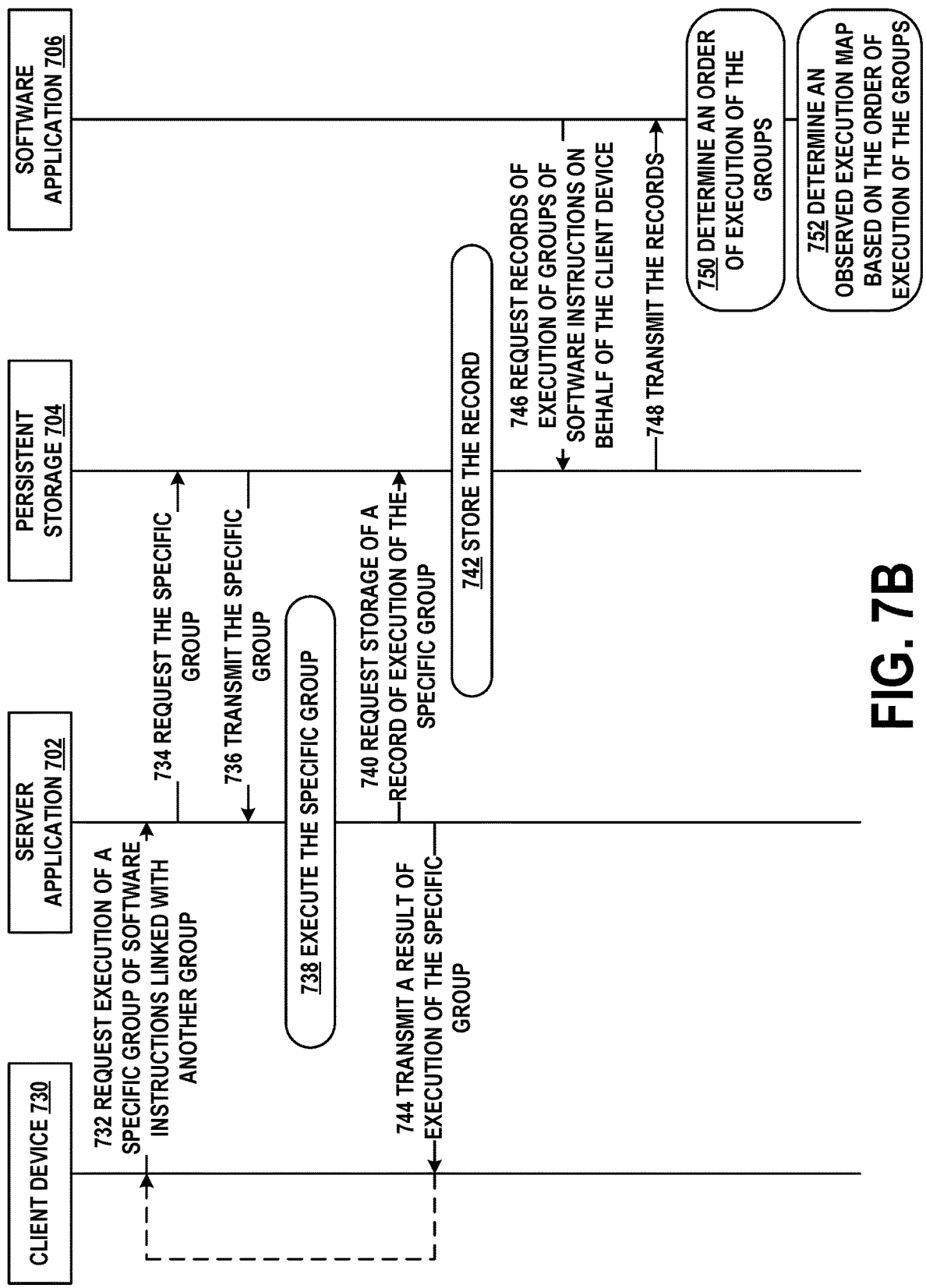
Figure 7C:
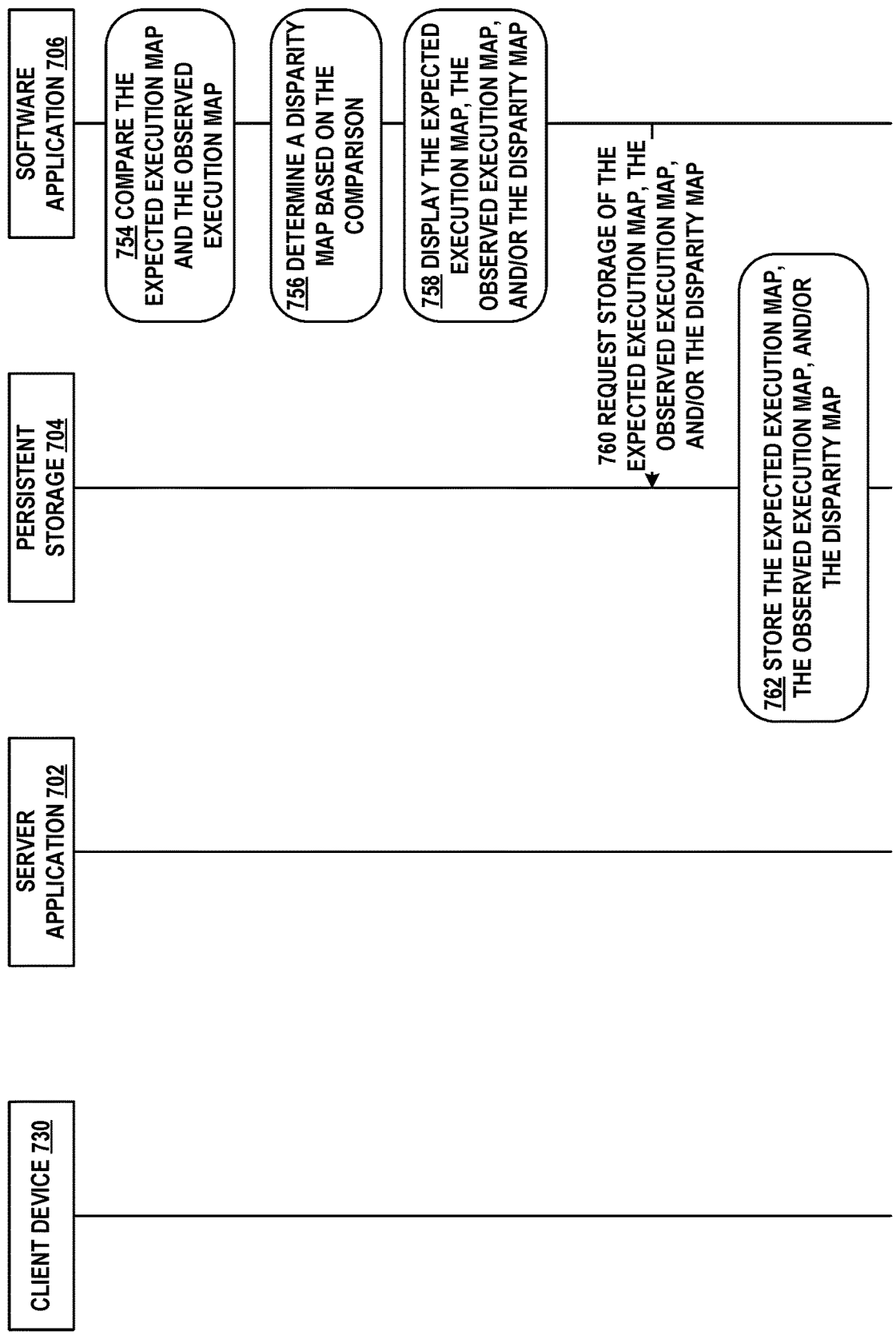

FIGS. 7A, 7B, and 7C illustrate operations involved in generating maps 630, 632, 634, 636, 638, and/or 640 (i.e., maps 630-640) shown in FIGS. 6A-6F. Specifically, FIGS. 7A, 7B, and 7C illustrate testing application 700, server application 702, persistent storage 704, software application 706, and client device 730. In some implementations, testing application 700, server application 702, persistent storage 704, and/or software application 706 may be provided by a computational instance (e.g., computational instance 322) of remote network management platform 320.

Server application 702 may be configured to execute the groups of software instructions that define the software product to be mapped. For example, server application 702 may be configured to execute one or more of the groups of software instructions in response to requests received from and/or by way of testing application 700 and/or client device 730. In cases where the software product corresponds to a web-based software application, server application 702 may represent computational resources configured to execute the software product on behalf of a client device. In cases where the software product corresponds to a native software application, server application 702 may additionally or alternatively represent aspects of an operating system and/or an application engine configured to execute the software product on the client device, and/or the software product itself.

Testing application 700 may be configured to execute one or more software tests with respect to the software product. The one or more software tests may include manual tests carried out by and/or executed in response to user input provided by human testers, and/or automated tests executed automatically and/or independently of user input provided by human testers. The one or more tests may include various types of tests, such as unit tests, integration tests, functional tests, regression tests, smoke tests, and/or load tests, among other possibilities.

Software application 706 may be configured to monitor operations carried out by testing application 700 and/or server application 702 in order to generate maps 630-640. Persistent storage 704 may be configured to store data utilized by server application 702, testing application 700, and/or software application 706. This data may be stored in one or more databases contained by persistent storage 704. For example, persistent storage 704 may be configured to store the groups of software instructions that define the software product, data utilized thereby, and/or records of execution of the software product in response to requests from testing application 700 and/or client device 730.

Client device 730 may represent a computing device configured to communicate with server application 702 to cause execution of one or more of the groups of software instruction that define the software product. In cases where the software product is provided as a native software application, client device 730 may be configured to execute testing application 700 and/or server application 702, and/or may contain persistent storage 704.

In some implementations, expected execution map 630 may be based on testing of the software product. Specifically, turning to FIG. 7A, testing application 700 may be configured to provide (e.g., transmit), to server application 702, a request for execution of a particular group of software instructions linked with another group of software instructions, as indicated by arrow 708. The request for execution of the particular group of software instructions may be part of one or more software tests being executed against the software product by testing application 700. The particular group of software instruction and the group of software instructions with which it is linked may each be part of a plurality of software instructions that define the software product. As discussed above, these groups of software instruction may represent software functions, web pages, UI components, and/or other collections of software code.

Based on and/or in response to reception of the request at arrow 708, server application 702 may be configured to provide, to persistent storage 704, a request for the particular group of software instructions, as indicated by arrow 710. Based on and/or in response to reception of the request at arrow 710, persistent storage 704 may be configured to provide, to server application 702, the particular group of software instructions, as indicated by arrow 712. Based on and/or in response to reception of the particular group of software instruction at arrow 712, server application 702 may be configured to execute the particular group of software instructions, as indicated by block 714.

Based on and/or in response to execution of the particular group of software instructions at block 714, server application 702 may be configured to provide, to persistent storage 704, a request for storage of a record of execution of the particular group of software instructions, as indicated by arrow 716. Based on and/or in response to reception of the request at arrow 716, persistent storage 704 may be configured to store the record, as indicated by block 718.

The record may include (i) an identifier associated with the particular group of software instructions, (ii) a time at which the particular group of software instructions was executed at block 714, (iii) an identifier (e.g., username of an account under which the testing was performed) associated with testing application 700, and/or (iv) an identifier associated with a particular session (e.g., session ID) as part of which the testing was being carried out, among other attributes and/or metadata associated with execution at block 714. The record may additionally or alternatively include other information that may be used to reconstruct one or more sequences in which the groups of software instructions of the software product were executed during testing. The record may constitute and/or form part of a log.

Based on and/or in response to execution of the particular group of software instructions at block 714, server application 702 may also be configured to provide, to testing application 700, a result of execution of the particular group of software instructions, as indicated by arrow 720. Based on and/or in response to reception of the result at arrow 720, testing application 700 may be configured to perform the operation of arrow 708 with respect to one or more additional groups of software instructions that the particular group of software instructions links to, as indicated by the dashed arrow connecting arrows 720 and 708.

This loop may be carried out multiple times during the testing process with respect to a plurality of linked groups of software instructions. Thus, testing application 700 may follow various test paths through the software product as part of testing, and the expected paths that a user is expected to follow may be based on the various test paths. For example, the expected paths may be equal to the test paths, since the software tests may be designed and/or intended to follow and test paths that are likely to be used by end users. In another example, the expected paths may be based on a combination (e.g., weighted combination) of test paths generated based on execution of automated tests and test paths generated based on execution of manual tests.

After storage of two or more records at block 718, software application 706 may be configured to provide, to persistent storage 704, a request for the two or more records of execution of groups of software instruction on behalf or (e.g., in response to request from) testing application 700, as indicated by arrow 722. The request at arrow 722 may be provided based on and/or in response to storage of the two or more records at block 718, a manual request provided to software application 706, passage of a predetermined period of time, and/or a signal received by software application 706 from testing application 700 indicating that at least one software test has been completed, among other possibilities. Based on and/or in response to reception of the request at arrow 722, persistent storage 704 may be configured to provide, to software application 706, the two or more records, as indicated by arrow 724.

The two or more records may allow software application 706 to determine and/or monitor how the paths provided through the software product have been traversed by the software tests executed by testing application 700. Accordingly, based on and/or in response to reception of the two or more records at arrow 724, software application 706 may be configured to determine an order of execution of the two or more groups of software instructions corresponding to the two or more records received at arrow 724, as indicated by block 726. For example, records associated with an identifier of testing application 700 and/or an identifier of a particular testing session may be arranged in a sequence according to the time at which each respective group of software instructions was executed. Thus, software application 706 may be configured to reconstruct the order in which the groups of software instructions were invoked and/or executed as part of a particular software test and/or a particular testing session.

Based on and/or in response to determining the order of execution of the groups of software instructions at block 726, software application 706 may be configured to determine an expected execution map (e.g., expected execution map 630), as indicated by block 728. Determining the expected execution map may involve generating nodes to represent the groups of software instructions that have been traversed by the software tests, determining one or more links between the nodes, determining a direction of each link, and/or determining a sequence of one or more links that define a multi-link path. Specifically, the nodes may be generated for each group of software instruction represented by the records received at arrow 724. The links, and the respective directions thereof, may be based on the order of execution of the groups of software instructions, with an earlier-executed group linking to a later-executed group. Thus, the expected execution map may represent a chronological reconstruction of the software testing process executed by testing application 700.

Software application 706 may also be configured to update the expected execution map over time, as additional records generated by additional software tests become available. Specifically, the additional records may be used to generate new nodes and/or new links, and/or may be used to update, for one or more links, the one or more values indicative of a traversal frequency of these links.

In some cases, the expected execution map may be generated independently of results of individual software test executed by testing application 700. That is, the expected execution map may reflect the fact that a particular link and/or path was tested, and is thus expected to be traversed, but the results of such testing might not affect the structure of the expected execution map. For example, both successful and failed software tests may be used to generate the expected execution map, since both of these results are indicative of an expectation that a given link and/or path will be traversed by a user. Any defects uncovered by the testing may be corrected, for example, prior to the software product being made available to the user.

In other cases, a defect in the software product may prevent a given software test from being completed. Thus, a correction of the defect may allow the given software test to be re-executed and completed. Accordingly, the expected execution map may be based on the completed software test, but might not be based on the incomplete software test, since the incomplete software test might not accurately reflect the entirety of the links and/or paths traversed by the given software test.

In some implementations, the expected execution map may, additionally or alternatively, be defined manually. For example, software application 706 (or server application 702) may provide a user interface for defining the nodes that represent the plurality of groups of software instructions, the links between the nodes, the direction or each link, and/or sequences of multi-link paths through the software product. Thus, a designer, programmer, tester, and/or another individual involved in the development of the software product may use the user interface to define aspects of the expected execution map. In some cases, the expected execution map may be based on a union of (i) linked nodes defined manually and (ii) linked nodes defined based on tracking of the software testing carried out by testing application 700. Thus, the expected execution map may represent both (i) usage of the software product expected by the designer(s), programmer(s), and/or tester(s), and (ii) usages of the software product explicitly tested by testing application 700.

The process of generating the observed execution map may be similar to the operations of arrow 708 through block 728. Specifically, turning to FIG. 7B, client device 730 may be configured to provide, to server application 702, a request for execution of a specific group of software instructions linked with another group of software instructions, as indicated by arrow 732. The specific group of software instruction and the group of software instructions with which it is linked may each be part of the plurality of software instructions that define the software product. The request for execution of the specific group of software instructions may be part of usage of the software product by an end user by way of client device 730.

Based on and/or in response to reception of the request at arrow 732, server application 702 may be configured to provide, to persistent storage 704, a request for the specific group of software instructions, as indicated by arrow 734. Based on and/or in response to reception of the request at arrow 734, persistent storage 704 may be configured to provide, to server application 702, the specific group of software instructions, as indicated by arrow 736. Based on and/or in response to reception of the specific group of software instruction at arrow 736, server application 702 may be configured to execute the specific group of software instructions, as indicated by block 738.

Based on and/or in response to execution of the specific group of software instructions at block 738, server application 702 may be configured to provide, to persistent storage 704, a request for storage of a record of execution of the specific group of software instructions, as indicated by arrow 740. Based on and/or in response to reception of the request at arrow 740, persistent storage 704 may be configured to store the record, as indicated by block 742.

The record stored at block 742 may include (i) an identifier associated with the specific group of software instructions, (ii) a time at which the specific group of software instructions was executed at block 738, (iii) an identifier (e.g., username of an account) associated with client device 730, and/or (iv) an identifier associated with a particular session (e.g., session ID) as part of which the usage of the software product by way of client device 730 carried out, among other attributes and/or metadata associated with execution at block 738. The record may additionally or alternatively include other information that may be used to reconstruct one or more sequences in which the groups of software instructions of the software product were executed based on and/or in response to user requests/input. The record may constitute and/or form part of a log.

Based on and/or in response to execution of the specific group of software instructions at block 738, server application 702 may also be configured to provide, to client device 730, a result of execution of the specific group of software instructions, as indicated by arrow 744. The result at arrow 744 may be a web page, a UI component, a screen and/or view of an application, and/or an output of a function, depending on the type of software product being used.

Based on and/or in response to reception of the result at arrow 744, client device 730 may be configured to allow the user to request execution of one or more additional groups of software instructions that the specific group of software instructions links to, as indicated by the dashed arrow connecting arrows 744 and 732. For example, the operations of arrow 708 through arrow 744 may be repeated based on the user selecting and/or interacting with one or more aspects of the result at arrow 744. This loop may be carried out multiple times with respect to a plurality of linked groups of software instructions as part of the end user's usage of the software product. Thus, client device 730 may allow the user to follow various paths through the software product as part of usage of the software product. The paths that a user has actually followed during usage of the software product may constitute the various observed paths represented in the observed execution map.

After storage of two or more records at block 742, software application 706 may be configured to provide, to persistent storage 704, a request for the two or more records of execution of groups of software instruction on behalf or (e.g., in response to request from) client device 730, as indicated by arrow 746. The request at arrow 746 may be provided based on and/or in response to storage of the two or more records at block 742, a manual request provided to software application 706, passage of a predetermined period of time, and/or a signal received by software application 706 from client device 730 indicating that at least one session of usage of the software product has been completed, among other possibilities. Based on and/or in response to reception of the request at arrow 746, persistent storage 704 may be configured to provide, to software application 706, the two or more records, as indicated by arrow 748.

The two or more records may allow software application 706 to determine and/or monitor how the paths provided through the software product have been actually traversed by the user using client device 730. Accordingly, based on and/or in response to reception of the two or more records at arrow 748, software application 706 may be configured to determine an order of execution of the two or more groups of software instructions corresponding to the two or more records received at arrow 748, as indicated by block 750. For example, records associated with an identifier of client device 730 and/or an identifier of a particular usage session may be arranged in a sequence according to the time at which each respective group of software instructions was executed. Thus, software application 706 may be configured to reconstruct the order in which the groups of software instructions were invoked and/or executed on behalf of the user as part of a particular usage session.

Based on and/or in response to determining the order of execution of the groups of software instructions at block 750, software application 706 may be configured to determine an observed execution map (e.g., observed execution map 632), as indicated by block 752. Determining the observed execution map may involve generating nodes to represent the groups of software instructions that have been traversed by the user, determining one or more links between the nodes, determining a direction of each link, and/or determining a sequence of one or more links that define a multi-link path. The observed execution map may represent a chronological reconstruction of the usage of the software product carried out by way of client device 730.

Software application 706 may also be configured to update the observed execution map over time, as additional records generated by additional end user usage become available. Specifically, the additional records may be used to generate new nodes and/or new links, and/or may be used to update, for one or more links, the one or more values indicative of a traversal frequency of these links.

Turning to FIG. 7C, software application 706 may be configured to compare the expected execution map and the observed execution map, as indicated by block 754. The comparison at block 754 may be carried out based on and/or in response to the determination of the expected execution map at block 728, the determination of the observed execution map at block 752, and/or updating of one or more of these maps. The comparison may involve determining, for each link in the maps, a quotient or a difference based on (e.g., between) the corresponding expected traversal frequency value(s) and the corresponding observed traversal frequency value(s).

Based on and/or in response to the comparison at block 754, software application 706 may be configured to determine a disparity map (e.g., disparity map 634, 636, 638, and/or 640), as indicated by block 756. Determining the disparity map may involve generating the nodes and links thereof based on the nodes and links present in the expected execution map and the observed execution map. Determining the disparity map may also involve associating each link with the corresponding disparity value determined as part of the comparison at block 754.

Software application 706 may also be configured to display the expected execution map, the observed execution map, and/or the disparity map, as indicated by block 758. The operations of block 758 may be executed based on and/or in response to the determination of the expected execution map at block 728, the determination of the observed execution map at block, the determination of the disparity map at block 756, and/or a user request, among other possibilities. For example, the expected execution map, the observed execution map, and/or the disparity map may each be displayed in the form of a Sankey diagram, where a width of arrows connecting the nodes is proportional to the corresponding values associated with the links between the nodes.

Software application 706 may further be configured to provide, to persistent storage 704, a request for storage of the expected execution map, the observed execution map, and/or the disparity map, as indicated by arrow 760. Based on and/or in response to reception of the request at arrow 760, persistent storage 704 may be configured to store the expected execution map, the observed execution map, and/or the disparity map, as indicated by block 762. One or more of the stored maps may be retrieved and displayed at a later time.

The expected execution map, the observed execution map, and/or the disparity map may be updated over time based on additional testing and/or usage of the software product. Thus, subsets of the operations of FIGS. 7A, 7B, and 7C may be repeated to generate updated expected execution maps, updated observed execution maps, and/or updated disparity maps. In some cases, the additional testing and/or usage of the software product may be monitored substantially in real time, and the updated maps may thus be generated substantially in real time (e.g., with no more than a threshold time delay between execution of a group of software instructions and mapping of this execution). Thus, software application 706 may allow developers, programmers, testers, and/or other individuals to assess and correct performance of the software product substantially in real time.

Further, in some cases, the expected execution map, the observed execution map, and/or the disparity map may be scoped to a particular set of groups of software instructions (i.e., subset of the software product) and/or a particular period of time. Software application 706 may provide a user interface by way of which a programmer, tester, developer, and/or other individual may be able to select the set(s) of groups of software instructions and/or the time period(s) to be represented by the maps. Thus, the maps may be configured to represent information regarding selected portions of the software product collected during selected periods of time, which may simplify the process of identifying aspects of the software product and/or the testing process thereof to be modified.

IX. Example Operations

Figure 8:
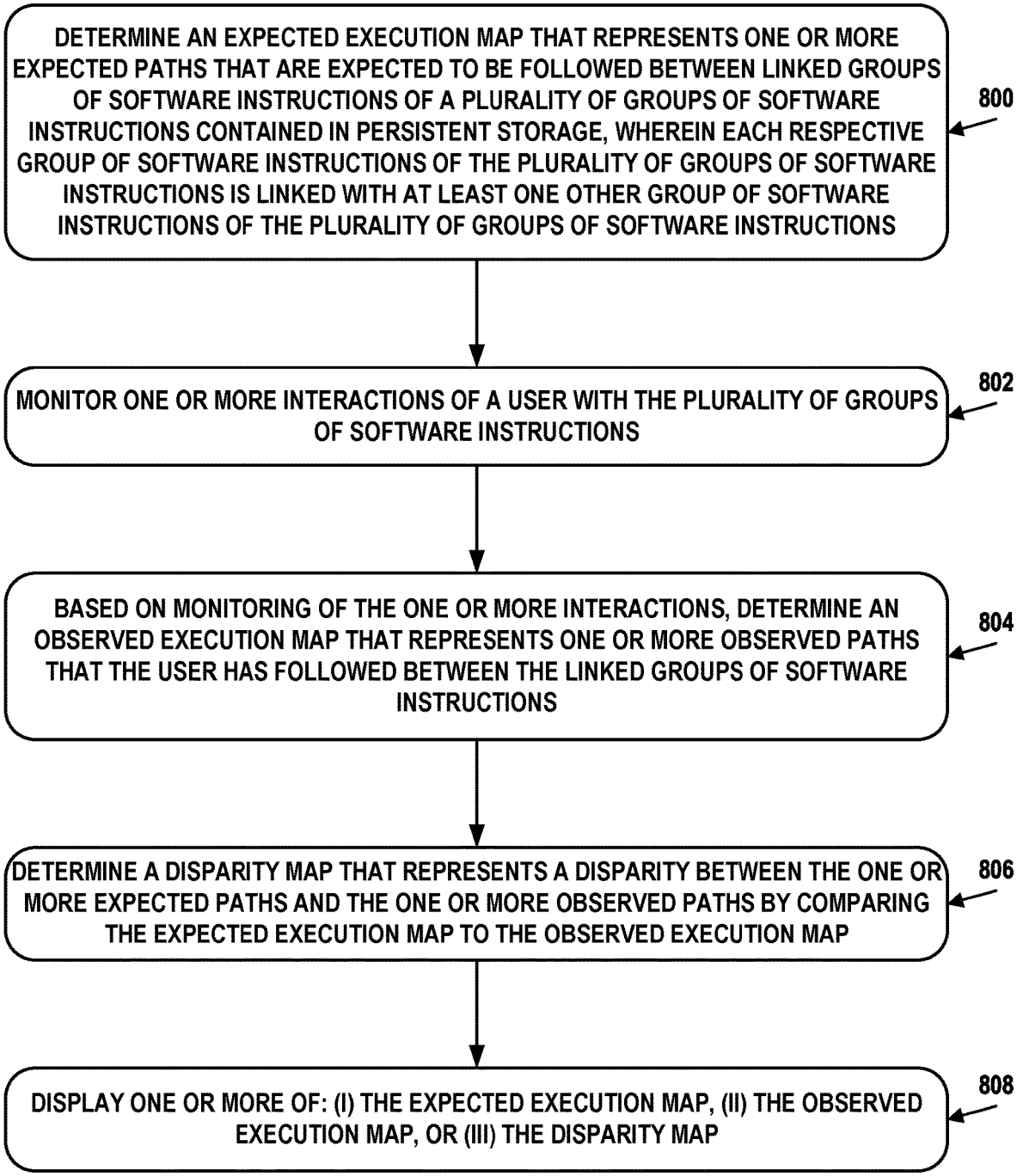
FIG. 8 is a flow chart, in accordance with example embodiments.

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a computational instance of a remote network management platform, software application 706, and/or a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve determining an expected execution map that represents one or more expected paths that are expected to be followed between linked groups of software instructions of a plurality of groups of software instructions contained in persistent storage. Each respective group of software instructions of the plurality of groups of software instructions may be linked with at least one other group of software instructions of the plurality of groups of software instructions.

Block 802 may involve monitoring one or more interactions of a user with the plurality of groups of software instructions.

Block 804 may involve, based on monitoring of the one or more interactions, determining an observed execution map that represents one or more observed paths that the user has followed between the linked groups of software instructions.

Block 806 may involve determining a disparity map that represents a disparity between the one or more expected paths and the one or more observed paths by comparing the expected execution map to the observed execution map.

Block 808 may involve displaying one or more of: (i) the expected execution map, (ii) the observed execution map, or (iii) the disparity map.

In some embodiments, determining the expected execution map may include monitoring one or more interactions of one or more automated tests with at least a subset of the plurality of groups of software instructions. Based on monitoring the one or more interactions of the one or more automated tests with at least the subset of the plurality of groups of software instructions, one or more automated test paths that the one or more automated tests have followed between the linked groups of software instructions may be determined. Based on the one or more automated test paths, the one or more expected paths may be determined.

In some embodiments, determining the expected execution map may include executing the one or more automated tests with respect to at least the subset of the plurality of groups of software instructions.

In some embodiments, determining the expected execution map may include monitoring one or more interactions of one or more manual tests with at least a subset of the plurality of groups of software instructions. Based on monitoring the one or more interactions of the one or more manual tests with at least the subset of the plurality of groups of software instructions, one or more manual test paths that the one or more manual tests have followed between the linked groups of software instructions may be determined. Based on the one or more manual test paths, the one or more expected paths may be determined.

In some embodiments, determining the expected execution map may include providing a user interface configured to allow for a manual definition of the one or more expected paths, and receiving, by way of the user interface, the manual definition of the one or more expected paths.

In some embodiments, monitoring the one or more interactions of the user with the plurality of groups of software instructions may include determining one or more groups of software instructions executed by a computing device based on user input. Determining the observed execution map may include (i) determining an order in which the one or more groups of software instructions were executed, and (ii) determining the one or more observed paths of the observed execution map based on the order in which the one or more groups of software instructions were executed.

In some embodiments, determining the observed execution map may include receiving a selection of (i) a subset of the plurality of groups of software instructions to be represented by the observed execution map and (ii) a time period to be represented by the observed execution map and during which interactions with the subset of the plurality of groups of software instructions have been monitored. The observed execution map may be determined based on the selection of (i) the subset of the plurality of groups of software instructions and (ii) the time period.

In some embodiments, the plurality of groups of software instructions may include a plurality of web pages. Each respective web page of the plurality of web pages may be linked with at least one other web page of the plurality of web pages in that (i) the at least one other web page may be accessible from the respective web page by way of a first corresponding hyperlink provided as part of the respective web page or (ii) the respective web page may be accessible from the at least one other web page by way of a second corresponding hyperlink provided as part of the at least one other web page.

In some embodiments, the plurality of groups of software instructions may include a plurality of software functions. Each respective software function of the plurality of software functions may be linked with at least one other software function of the plurality of software functions in that (i) the respective software function may be configured to trigger execution of the at least one other software function or (ii) the at least one other software function may be configured to trigger execution of the respective software function.

In some embodiments, the plurality of groups of software instructions may include a plurality of user interface (UI) components. Each respective UI component of the plurality of UI components may be linked with at least one other UI component of the plurality of UI components in that (i) interaction with the respective UI component may be configured to cause a first modification of the at least one other UI component or (ii) interaction with the at least one other UI component may be configured to cause a second modification of the respective UI component.

In some embodiments, the expected execution map may represent, for each respective expected path of the one or more expected paths, a corresponding first value indicative of a first frequency with which the respective path is expected to be followed between corresponding linked groups of software instructions. The observed execution map may represent, for each respective observed path of the one or more observed paths, a corresponding second value indicative of a second frequency with which the user has followed the respective expected path between corresponding linked groups of software instructions. The disparity map may represent, for each respective observed path, a corresponding third value indicative of a particular disparity between the corresponding second value and the corresponding first value.

In some embodiments, determining the disparity map may include comparing the expected execution map to the observed execution map by determining a difference based on the expected execution map and the observed execution map. The disparity map may be a difference map that represents the difference based on the one or more expected paths and the one or more observed paths. The corresponding third value for each respective observed path of the difference map may represent the difference based on the corresponding first value and the corresponding second value.

In some embodiments, determining the disparity map may include comparing the expected execution map to the observed execution map by determining a quotient based on the expected execution map and the observed execution map. The disparity map may be a quotient map that represents the quotient based on the one or more expected paths and the one or more observed paths. The corresponding third value for each respective observed path of the quotient map may represent the quotient based on the corresponding first value and the corresponding second value.

In some embodiments, displaying the one or more of: (i) the expected execution map, (ii) the observed execution map, or (iii) the disparity map may include (i) displaying the expected execution map, where a first visual appearance of each respective expected path may be based on the corresponding first value, (ii) displaying the observed execution map, where a second visual appearance of each respective observed path may be based on the corresponding second value, or (iii) displaying the disparity map, where a third visual appearance of each respective observed path may be based on the corresponding third value.

In some embodiments, each of (i) the expected execution map, (ii) the observed execution map, and (iii) the disparity map may include a plurality of nodes and a plurality of unidirectional links among the plurality of nodes. Each respective node of the plurality of nodes may represent a corresponding group of software instructions of the plurality of groups of software instructions. Each respective unidirectional link of the plurality of unidirectional links may connect a corresponding first node of the plurality of nodes to a corresponding second node of the plurality of nodes to indicate that a first group of software instructions represented by the corresponding first node links to a second group of software instructions represented by the corresponding second node.

In some embodiments, based on the disparity map, a particular observed path of the one or more observed paths that is not part of the one or more expected paths may be identified. Based on identifying the particular observed path, an indication that the particular observed path is not part of the one or more expected paths may be displayed.

In some embodiments, an indication to adjust one or more tests for the plurality of groups of software instructions may be provided based on the disparity map.

X. Closing

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, or compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computing system comprising:
  persistent storage containing a plurality of groups of software instructions, wherein each respective group of software instructions of the plurality of groups of software instructions is linked with at least one other group of software instructions of the plurality of groups of software instructions; and
  a software application configured to perform operations comprising:
    determining an expected execution map that represents (i) a plurality of expected paths that are expected to be followed between linked groups of software instructions of the plurality of groups of software instructions and (ii) a first plurality of values comprising, for each respective expected path of the plurality of expected paths, a corresponding first value indicative of a first frequency with which the respective expected path is expected to be followed;
    monitoring one or more interactions of a user with the plurality of groups of software instructions;
    based on the monitoring of the one or more interactions, determining an observed execution map that represents (i) a plurality of observed paths that the user has followed between the linked groups of software instructions and (ii) a second plurality of values comprising, for each respective observed path of the plurality of observed paths, a corresponding second value indicative of a second frequency with which the user has followed the respective observed path;
    determining, by comparing the expected execution map to the observed execution map, a disparity map that represents (i) a disparity between the plurality of expected paths and the plurality of observed paths and (ii) a third plurality of values comprising, for each respective observed path, a corresponding third value indicative of a particular disparity between the corresponding second value and the corresponding first value; and
    displaying one or more of: (i) the expected execution map, (ii) the observed execution map, or (iii) the disparity map.

2. The computing system of claim 1, wherein determining the expected execution map comprises:
  monitoring one or more interactions of one or more automated tests with at least a subset of the plurality of groups of software instructions;
  based on the monitoring of the one or more interactions of the one or more automated tests with at least the subset of the plurality of groups of software instructions, determining one or more automated test paths that the one or more automated tests have followed between the linked groups of software instructions; and
  based on the one or more automated test paths, determining the plurality of expected paths.

3. The computing system of claim 1, wherein determining the expected execution map comprises:
  monitoring one or more interactions of one or more manual tests with at least a subset of the plurality of groups of software instructions;
  based on the monitoring of the one or more interactions of the one or more manual tests with at least the subset of the plurality of groups of software instructions, determining one or more manual test paths that the one or more manual tests have followed between the linked groups of software instructions; and based on the one or more manual test paths, determining the plurality of expected paths.

4. The computing system of claim 1, wherein determining the expected execution map comprises:

providing a user interface configured to allow for a manual definition of one or more expected paths of the plurality of expected paths; and receiving, by way of the user interface, the manual definition of the one or more expected paths of the plurality of expected paths.

5. The computing system of claim 1, wherein:

monitoring the one or more interactions of the user with the plurality of groups of software instructions comprises determining one or more groups of software instructions executed by a computing device based on user input, and determining the observed execution map comprises (i) determining an order in which the one or more groups of software instructions were executed, and (ii) determining the plurality of observed paths of the observed execution map based on the order in which the one or more groups of software instructions were executed.

6. The computing system of claim 1, wherein determining the observed execution map comprises:

receiving a selection of (i) a subset of the plurality of groups of software instructions to be represented by the observed execution map and (ii) a time period to be represented by the observed execution map and during which interactions with the subset of the plurality of groups of software instructions have been monitored; and determining the observed execution map based on the selection of (i) the subset of the plurality of groups of software instructions and (ii) the time period.

7. The computing system of claim 1, wherein the plurality of groups of software instructions comprise a plurality of web pages, wherein each respective web page of the plurality of web pages is linked with at least one other web page of the plurality of web pages in that (i) the at least one other web page is accessible from the respective web page by way of a first corresponding hyperlink provided as part of the respective web page or (ii) the respective web page is accessible from the at least one other web page by way of a second corresponding hyperlink provided as part of the at least one other web page.

8. The computing system of claim 1, wherein the plurality of groups of software instructions comprise a plurality of software functions, wherein each respective software function of the plurality of software functions is linked with at least one other software function of the plurality of software functions in that (i) the respective software function is configured to trigger execution of the at least one other software function or (ii) the at least one other software function is configured to trigger execution of the respective software function.

9. The computing system of claim 1, wherein the plurality of groups of software instructions comprise a plurality of user interface (UI) components, wherein each respective UI component of the plurality of UI components is linked with at least one other UI component of the plurality of UI components in that (i) interaction with the respective UI component is configured to cause a first modification of the at least one other UI component or (ii) interaction with the at least one other UI component is configured to cause a second modification of the respective UI component.

10. The computing system of claim 1, wherein determining the disparity map comprises:

comparing the expected execution map to the observed execution map by determining a difference map based on the expected execution map and the observed execution map, wherein the disparity map comprises the difference map, and wherein the corresponding third value for each respective observed path of the difference map is based on a difference between the corresponding first value and the corresponding second value.

11. The computing system of claim 1, wherein determining the disparity map comprises:

comparing the expected execution map to the observed execution map by determining a quotient map based on the expected execution map and the observed execution map, wherein the disparity map comprises the quotient map, and wherein the corresponding third value for each respective observed path of the quotient map is based on a quotient between the corresponding first value and the corresponding second value.

12. The computing system of claim 1, wherein displaying the one or more of: (i) the expected execution map, (ii) the observed execution map, or (iii) the disparity map comprises:

displaying the expected execution map, wherein a first visual appearance of each respective expected path is based on the corresponding first value;

displaying the observed execution map, wherein a second visual appearance of each respective observed path is based on the corresponding second value; or displaying the disparity map, wherein a third visual appearance of each respective observed path is based on the corresponding third value.

13. The computing system of claim 1, wherein each of (i) the expected execution map, (ii) the observed execution map, and (iii) the disparity map comprises:

a plurality of nodes, wherein each respective node of the plurality of nodes represents a corresponding group of software instructions of the plurality of groups of software instructions; and a plurality of unidirectional links among the plurality of nodes, wherein each respective unidirectional link of the plurality of unidirectional links connects a corresponding first node of the plurality of nodes to a corresponding second node of the plurality of nodes to indicate that a first group of software instructions, represented by the corresponding first node, links to a second group of software instructions represented by the corresponding second node.

14. The computing system of claim 1, wherein the operations further comprise:

identifying, based on the disparity map, a particular observed path of the plurality of observed paths that is not part of the plurality of expected paths; and based on identifying the particular observed path, displaying an indication that the particular observed path is not part of the plurality of expected paths.

15. The computing system of claim 1, wherein the operations further comprise:

providing an indication to adjust one or more tests for the plurality of groups of software instructions based on the disparity map.

16. A computer-implemented method comprising:
- determining an expected execution map that represents (i) a plurality of expected paths that are expected to be followed between linked groups of software instructions of a plurality of groups of software instructions contained in persistent storage and (ii) a first plurality of values comprising, for each respective expected path of the plurality of expected paths, a corresponding first value indicative of a first frequency with which the respective expected path is expected to be followed, wherein each respective group of software instructions of the plurality of groups of software instructions is linked with at least one other group of software instructions of the plurality of groups of software instructions;
- monitoring one or more interactions of a user with the plurality of groups of software instructions;
- based on the monitoring of the one or more interactions, determining an observed execution map that represents (i) a plurality of observed paths that the user has followed between the linked groups of software instructions and (ii) a second plurality of values comprising, for each respective observed path of the plurality of observed paths, a corresponding second value indicative of a second frequency with which the user has followed the respective observed path;
- determining, by comparing the expected execution map to the observed execution map, a disparity map that represents (i) a disparity between the plurality of expected paths and the plurality of observed paths and (ii) a third plurality of values comprising, for each respective observed path, a corresponding third value indicative of a particular disparity between the corresponding second value and the corresponding first value; and
- displaying one or more of: (i) the expected execution map, (ii) the observed execution map, or (iii) the disparity map.

17. The computer-implemented method of claim 16, wherein determining the expected execution map comprises:
- monitoring one or more interactions of one or more automated tests with at least a subset of the plurality of groups of software instructions;
- based on the monitoring of the one or more interactions of the one or more automated tests with at least the subset of the plurality of groups of software instructions, determining one or more automated test paths that the one or more automated tests have followed between the linked groups of software instructions; and
- based on the one or more automated test paths, determining the plurality of expected paths.

18. The computer-implemented method of claim 16, wherein determining the expected execution map comprises:
- monitoring one or more interactions of one or more manual tests with at least a subset of the plurality of groups of software instructions;
- based on the monitoring of the one or more interactions of the one or more manual tests with at least the subset of the plurality of groups of software instructions, determining one or more manual test paths that the one or more manual tests have followed between the linked groups of software instructions; and
- based on the one or more manual test paths, determining the plurality of expected paths.

19. The computer-implemented method of claim 16, wherein determining the disparity map comprises:
- comparing the expected execution map to the observed execution map by determining a quotient map based on the expected execution map and the observed execution map, wherein the disparity map comprises the quotient map, and wherein the corresponding third value for each respective observed path of the quotient map is based on a quotient between the corresponding first value and the corresponding second value.

20. An article of manufacture including a non-transitory computer-readable medium, having stored thereon program instructions that, upon execution by a computing system, cause the computing system to perform operations comprising:
- determining an expected execution map that represents (i) a plurality of expected paths that are expected to be followed between linked groups of software instructions of a plurality of groups of software instructions contained in persistent storage and (ii) a first plurality of values comprising, for each respective expected path of the plurality of expected paths, a corresponding first value indicative of a first frequency with which the respective expected path is expected to be followed, wherein each respective group of software instructions of the plurality of groups of software instructions is linked with at least one other group of software instructions of the plurality of groups of software instructions;
- monitoring one or more interactions of a user with the plurality of groups of software instructions;
- based on the monitoring of the one or more interactions, determining an observed execution map that represents (i) a plurality of observed paths that the user has followed between the linked groups of software instructions and (ii) a second plurality of values comprising, for each respective observed path of the plurality of observed paths, a corresponding second value indicative of a second frequency with which the user has followed the respective observed path;
- determining, by comparing the expected execution map to the observed execution map, a disparity map that represents (i) a disparity between the plurality of expected paths and the plurality of observed paths and (ii) a third plurality of values comprising, for each respective observed path, a corresponding third value indicative of a particular disparity between the corresponding second value and the corresponding first value; and
- displaying one or more of: (i) the expected execution map, (ii) the observed execution map, or (iii) the disparity map.

* * * * *